United States Patent
Dolby et al.

(10) Patent No.: US 11,868,166 B2
(45) Date of Patent: Jan. 9, 2024

(54) REPAIRING MACHINE LEARNING PIPELINES

(71) Applicant: International Business Machines Corporation, Armonk, NY (US)

(72) Inventors: Julian Timothy Dolby, Bronx, NY (US); Jason Tsay, White Plains, NY (US); Martin Hirzel, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 118 days.

(21) Appl. No.: 17/444,498

(22) Filed: Aug. 5, 2021

(65) Prior Publication Data
US 2023/0059857 A1 Feb. 23, 2023

(51) Int. Cl.
*G06F 11/36* (2006.01)
*G06N 20/00* (2019.01)

(52) U.S. Cl.
CPC ...... *G06F 11/3692* (2013.01); *G06F 11/3684* (2013.01); *G06F 11/3688* (2013.01); *G06N 20/00* (2019.01)

(58) Field of Classification Search
CPC .. G06F 11/36; G06F 11/3692; G06F 11/3684; G06F 11/3688; G06N 20/00
See application file for complete search history.

(56) References Cited

U.S. PATENT DOCUMENTS

| 9,972,063 | B2 | 5/2018 | Ashari | |
| 11,269,911 | B1* | 3/2022 | Jones | G06F 9/543 |
| 2013/0097463 | A1* | 4/2013 | Marvasti | H04L 41/142 714/47.1 |
| 2017/0075744 | A1* | 3/2017 | Deshpande | H04L 41/0631 |
| 2019/0141079 | A1* | 5/2019 | Vidas | H04L 63/0227 |
| 2020/0225655 | A1* | 7/2020 | Cella | G05B 19/41875 |
| 2020/0250078 | A1 | 8/2020 | Jagannath | |
| 2020/0272909 | A1* | 8/2020 | Parmentier | G06N 3/126 |
| 2020/0272947 | A1 | 8/2020 | Carullo | |

(Continued)

FOREIGN PATENT DOCUMENTS

EP 3779806 A1 2/2021

OTHER PUBLICATIONS

Anonymous et al., "Maro: ML Automated Remediation Oracle", Proceedings of The 29th ACM Joint European Software Engineering Conference and Symposium on the Foundations of Software Engineering (ESEC/FSE 2021), 11 pages.

(Continued)

*Primary Examiner* — Kamini B Patel
(74) *Attorney, Agent, or Firm* — Joseph P. Curcuru

(57) ABSTRACT

In an approach to improve detecting and correcting errors in one or more machine learning pipelines. Embodiments comprise generating a plurality of test machine learning pipeline instances based upon a target machine learning pipeline and evaluating the plurality of test machine learning pipeline instances for failure in a task. Further, embodiments identify one or more root causes of error based upon the evaluated plurality of test machine learning pipeline instances and failure in the task, and create a remediated target machine learning pipeline based upon the identified one or more root causes of error. Additionally, embodiments output the remediated machine learning pipelines.

20 Claims, 17 Drawing Sheets

(56) References Cited

U.S. PATENT DOCUMENTS

| | | | | |
|---|---|---|---|---|
| 2020/0348662 A1* | 11/2020 | Cella | ................ | G05B 23/0286 |
| 2020/0401950 A1* | 12/2020 | Han | ................ | G06N 20/20 |
| 2021/0019612 A1* | 1/2021 | Carrasco | ................ | G06N 5/01 |
| 2021/0081848 A1 | 3/2021 | Polleri | | |
| 2021/0097444 A1 | 4/2021 | Bansal | | |
| 2021/0098133 A1 | 4/2021 | Chowdhry | | |
| 2021/0157312 A1* | 5/2021 | Cella | ................ | G05B 19/4184 |
| 2022/0108262 A1* | 4/2022 | Cella | ................ | G06Q 10/063118 |
| 2022/0294686 A1* | 9/2022 | Triplet | ................ | H04L 41/0636 |
| 2022/0345356 A1* | 10/2022 | Triplet | ................ | H04L 41/0654 |
| 2023/0027149 A1* | 1/2023 | Kuan | ................ | H04L 63/20 |

OTHER PUBLICATIONS

Lourenco et al., "BugDoc: Algorithms to Debug Computational Processes", SIGMOD Jun. 14-19, 2020, Portland, OR, USA, 16 pages.

\* cited by examiner

```
one_hot_encoder = OneHotEncoder(handle_unknown="ignore")
planned = SimpleImputer >> one_hot_encoder >> LogisticRegression
```

FIG. 3

```
hyperopt_trainable = Hyperopt(estimator=planned, max_evals=20)
hyperopt_trained = hyperopt_trainable.fit(train_X, train_y)
```

Please wait ...
Done, 15 out of 20 evaluations failed, call summary() for details.

FIG. 4

```
hyperopt_trained.summary()
```

| name | tid | loss | time | log_loss | status |
|---|---|---|---|---|---|
| p0 | 0 | NaN | NaN | NaN | fail |
| p1 | 1 | -0.514286 | 0.56447 | 0.815479 | ok |
| p2 | 1 | -0.514286 | 0.58215 | 0.810590 | ok |
| ... | ... | ... | ... | ... | ... |
| p17 | 17 | NaN | NaN | NaN | fail |
| p18 | 18 | NaN | NaN | NaN | fail |
| p19 | 19 | NaN | NaN | NaN | fail |

20 rows x 5 columns

FIG. 5 hyperopt_trained.get-pipeline("p0").pretty_print()

```
simple_imputer = SimpleImputer(strategy="median")
one_hot_encoder = OneHotencoder(handle_unknown="ignore")
logistic_regression = LogisticRegression(
    dual=True,
    fit_intercept=False,
    intercept_scaling=0.48518719297596336,
    max_iter=326, Maro: ML Automated Remediation Oracle solver="liblinear",
    tol=0.006373368408152854,
)
pipeline = simple_imputer >> one_hot_encoder >> logistic_regression
```

FIG. 6

```
remediated = auto_remediate(planned, hyperopt_trained)
pipeline_diff(planned, remediated)
```

```
+ simple_imputer = SimpleImputer.customize_schema(
+     strategy={"enum": ["most_frequent"] }
+ )
  one_hot_encoder = OneHotEncoder(handle_unknown="ignore")
- pipeline = SimpleImputer >> one_hot_encoder >> LogisticRegression
?            ^            ^
+ pipeline = simple_imputer >> one_hot_encoder >> LogisticRegression
?            ^            ^^
```

FIG. 7

```
hyperopt_trainable = Hyperopt(estimator=remediated), max_evals=20)
hyperopt_trained = hyperopt_trainable.fit(train_X, train_y)
```

Please wait ...
Done, all evaluations succeeded.

FIG. 8 project = Project(columns={"type": "number"})
planned = (project | NoOp) >> LogisticRegression project = Project(columns={"type": "number"})
remediated = project >> LogisticRegression

Operator choice 1010.

project = Project ({"type" : " string " })
one_hot = OneHotEncoder(handle_unknown="ignore")
planned = project >> one_hot >> StandardScaler >> LogisticRegression project = Project ({" type": " string " })
one_hot = OneHotEncoder(handle_unknown="ignore")
standard_scaler = StandardScaler.customize_schema(
    with_mean={"enum": [False]})
remediated = project >> one_hot >> standard_scaler >> LogisticRegression

Boolean in transformer 1020.

project = Project ({" type" : " string " })
one_hot = OneHotEncoder(handle_unknown="ignore")
planned = project >> SimpleImputer >> one_hot >>LogisticRegression project = Project ({" type": " string " })
simple_imputer =SimpleImputer.customize_schema(
    strategy={"enum": ["most_frequent"]})
one_hot = OneHotEncoder(handle_unknown="ignore")
remediated = project >> simple_imputer >> one_hot >> LogisticRegression

Enum in transformer 1030.

planned = PCA >>GradientBoostingClassifier gradient_boosting = GradientBoostingClassifier.customize_schema(
    loss={"enum": ["deviance"]})
remediated = PCA >> gradient_boosting

Enum in classifier 1040.

k_neighbors_classifier = KNeighborsClassifier.customize_schema(
n_neighbors={"type": "integer", "minimum": 1, "maximum": 40})
planned = (PCA | PolynomialFeatures) >>k_neighbors_classifier k_neighbors_classifier = KNeighborsClassifier.customize_schema(
    n_neighbors={"minimum": 1, "maximum": 16.5, " type" : " integer "})
remediated = (PCA | PolynomialFeatures) >>k_neighbors_classifier

Range in classifier 1050.

FIG. 10A

```
planned = PCA >> LogisticRegression
```

```
pca = PCA.customize_schema(
  n_components={"minimum": 1, "maximum": 63, "type": "integer"})
select_k_best = SelectKBest.customize_schema(
  k={"minimum": 1, "maximum": 63, "type": "integer"})
planned = pca >> select_k_best >> LogisticRegression
```

```
pca_0 = PCA.customize_schema(
  whiten={"enum": [False]}, svd_solver={"enum": ["arpack"]})
pca_1 = PCA.customize_schema(
  svd_solver={
    "allOf": [
      {"not": {"enum": ["arpack"]}},
      {"enum": ["auto", "full", "arpack", "randomized"]}]})
remediated = (
  pca_0 >> LogisticRegression
  | pca_1 >> LogisticRegression
)
```

Multiple hyperparameters 1060.

```
pca_0 = PCA.customize_schema(
  n_components={"minimum": 13, "maximum": 62, "type": "integer"})
select_k_best_0 = SelectKBest.customize_schema(
  k={"minimum": 1, "maximum": 13, "type": "integer"})
pca_1 = PCA.customize_schema(
  n_components={"minimum": 25, "maximum": 62, "type": "integer"})
select_k_best_1 = SelectKBest.customize_schema(
  k={"minimum": 1, "maximum": 25, "type": "integer"})
pca_2 = PCA.customize_schema(
  n_components={"minimum": 38, "maximum": 62, "type": "integer"})
select_k_best_2 = SelectKBest.customize_schema(
  k={"minimum": 1, "maximum": 38, "type": "integer"})
remediated = (
  pca_0 >> select_k_best_0 >> LogisticRegression
  | pca_1 >> select_k_best_1 >> LogisticRegression
  | pca_2 >> select_k_best_2 >> LogisticRegression
)
```

Multiple operators 1070.

FIG. 10B

| Example pipeline | 20 evaluations orig. | 20 evaluations rem. | 500 evaluations orig. | 500 evaluations rem. |
|---|---|---|---|---|
| (a) Operator choice | 7 | 0 | 72 | 0 |
| (b) Boolean in transformer | 3 | 0 | 40 | 0 |
| (c) Enum in transformer | 15 | 0 | 127 | 0 |
| (d) Enum in classifier | 11 | 0 | 122 | 0 |
| (e) Range in classifier | 12 | 0 | 157 | 0 |
| (f) Multiple hyperparameters | 2 | 0 | 27 | 0 |
| (g) Multiple operators | 12 | 0 | 185 | 0 |

FIG. 11

| Example pipeline | 20 evaluations | 50 evaluations |
|---|---|---|
| (a) Operator choice | 2.4 | 8.7 |
| (b) Boolean in transformer | 3.7 | 12.8 |
| (c) Enum in transformer | 3.9 | 13.1 |
| (d) Enum in classifier | 3.8 | 11.0 |
| (e) Range in classifier | 2.4 | 6.0 |
| (f) Multiple hyperparameters | 4.8 | 13.6 |
| (g) Multiple operators | 3.1 | 10.3 |

FIG. 12

REPAIRING MACHINE LEARNING PIPELINES

BACKGROUND OF THE INVENTION

The present invention relates generally to the field of machine learning (ML), and more particularly to identifying and repairing machine learning pipelines.

A machine learning (ML) pipeline is a way to codify and automate the workflow necessary to produce a machine learning model. Machine learning pipelines consist of multiple sequential steps that perform a variety of tasks ranging from data extraction and preprocessing to model training and deployment. For data science teams, the production pipeline should be a central product. An ML pipeline enables the automation of machine learning workflow by enabling data to be transformed and correlated into a model that can then be analyzed to achieve outputs. The ML pipeline makes the process of inputting data into the ML model fully automated. Another type of ML pipeline is the art of splitting up your machine learning workflows into independent, reusable, modular parts that can then be pipelined together to create models. The splitting type of ML pipeline makes building models more efficient and simplified, cutting out redundant work. The ML pipeline encapsulates the learned best practices of producing a machine learning model for the organization's use-case and allows a team to execute at scale. Traditionally, ML pipelines involve overnight batch processing, i.e., collecting data, sending it through an enterprise message bus and processing it to provide pre-calculated results and guidance for next day operations. Whilst this works in some industries, it can become insufficient in others, especially when it comes to ML applications.

SUMMARY

Embodiments of the present invention disclose a computer-implemented method, a computer program product, and a system for detecting and correcting errors in one or more machine learning pipelines, the computer-implemented method comprising: generating, by a computing device, a plurality of test machine learning pipeline instances based upon a target machine learning pipeline, evaluating, by the computing device, the plurality of test machine learning pipeline instances for failure in a task, identifying, by the computing device, one or more root causes of error based upon the evaluated plurality of test machine learning pipeline instances and failure in the task, creating, by the computing device, a remediated target machine learning pipeline based upon the identified one or more root causes of error, and outputting the remediated machine learning pipeline.

BRIEF DESCRIPTION OF THE DRAWINGS

FIG. 3 contains exemplary algorithm, in accordance with an embodiment of the present invention;

FIG. 4 contains exemplary output message, in accordance with an embodiment of the present invention;

FIG. 5 contains exemplary output message, in accordance with an embodiment of the present invention;

FIG. 6 contains exemplary algorithm, in accordance with an embodiment of the present invention;

FIG. 7 contains exemplary algorithm, in accordance with an embodiment of the present invention;

FIG. 8 contains exemplary output message, in accordance with an embodiment of the present invention;

FIG. 10A contains exemplary planned pipelines and their automated remediations, in accordance with an embodiments of the present invention;

FIG. 10B contains exemplary planned pipelines and their automated remediations, in accordance with an embodiments of the present invention;

FIG. 11 contains exemplary table describing the number of failures before and after mitigations, in accordance with an embodiment of the present invention;

FIG. 12 contains exemplary table describing the number of failures before and after mitigations, in accordance with an embodiment of the present invention;

DETAILED DESCRIPTION

Figure 1:
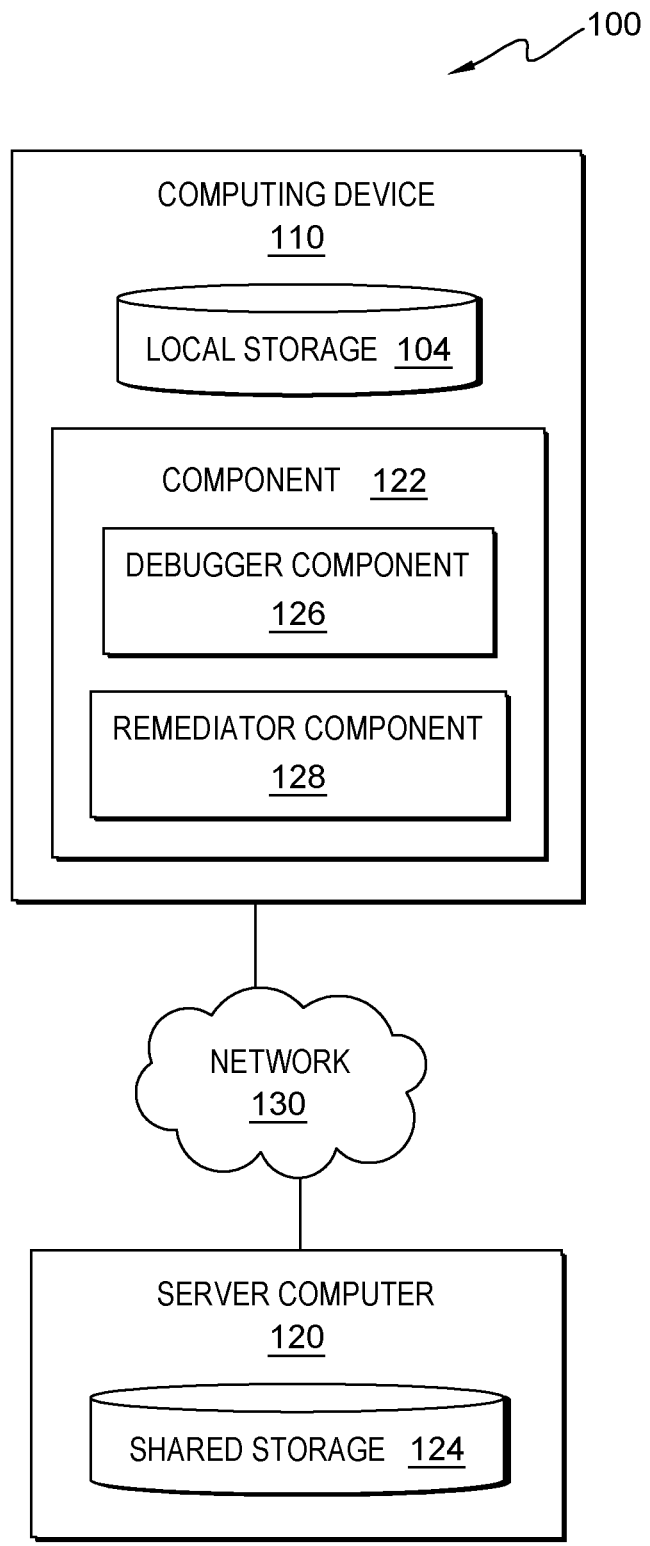
FIG. 1 is a functional block diagram illustrating a distributed data processing environment, in accordance with an embodiment of the present invention.

Embodiments of the present invention recognize that machine learning (ML) pipelines are often error-prone and difficult for data scientists to debug. One particular issue is that there is a wide space of possible causes for errors in one or more ML pipelines. For example, an often subtle error in ML pipelines is that hyperparameters may be configured incorrectly which leads to crashes or unacceptable performance. Embodiments of the present invention recognize that manually identifying errors in this situation (i.e., hyperparameters being configured incorrectly) is often difficult; for example, there may be constraints across multiple hyperparameters or even across hyperparameters in different parts of the pipeline. Embodiments of the present invention recognize that another cause of errors in ML pipelines arise from assumptions concerning the input data that may be incorrect. This may even be true for intermediate data that has already undergone preprocessing in an earlier pipeline step. Embodiments of the present invention recognize ML pipeline repair is difficult. For instance, a single error case may not be enough to ascertain the cause of the error (especially since there are so many possible causes). With approaches such as automated machine learning (AutoML), multiple instances are often generated and only a few of the multiple instances fail. The responsibility to infer the cause of the error across these multiple instances falls onto the data scientists. Embodiments of the present invention recognize that the debugging process is made even more difficult in that the data scientist often interpret long stack traces since the actual error is raised from deep within ML libraries Embodiments of the present invention improve the current art and solve the particular issues stated above by alleviating many of the difficulties facing data scientists through automatically debugging and repairing ML pipelines. Embodiments of the present invention improve the art by executing an automated machine learning (ML) pipeline repair tool that retrieves or receives one or more planned ML pipelines, generates pipeline instances and corresponding pipeline statuses of the one or more planned ML pipelines, and outputs a remediated pipeline that repairs errors in the one or more planned pipelines.

Embodiments of the present invention may detect one or more errors in a machine learning pipeline and automatically corrects the detected errors. Embodiments of the present invention may correct the detected errors, and improve the art by (i) receiving from a computing device a target machine learning pipeline, (ii) generating by the computing device a plurality of test machine learning pipelines instances based upon the target machine learning pipeline, (iii) evaluating by the computing device the plurality of test machine learning pipeline instances for success or failure in a task, (iii) determining by the computing device based upon the evaluated plurality of test machine learning pipeline instances and the success or failure in the task one or more root causes of error, and (iv) creating by the computing device a repaired target machine learning pipeline based upon the one or more root causes of error.

It should be noted herein that in the described embodiments, participating parties have consented to participating and being monitored/tracked, and participating parties are aware of the potential that such tracking and monitoring may be taking place. In various embodiments, for example, when downloading or operating an embodiment of the present invention, the embodiment of the invention presents a terms and conditions prompt enabling the user to opt-in or opt-out of participation. Some embodiments of the present invention include periodic reminders of the tracking, recording, and/or monitoring of the information about the user throughout the course of any such use.

Implementation of embodiments of the invention may take a variety of forms, and exemplary implementation details are discussed subsequently with reference to the Figures (i.e., FIG. 1-FIG. 20).

FIG. 1 is a functional block diagram illustrating a distributed data processing environment, generally designated 100, in accordance with one embodiment of the present invention. The term "distributed" as used in this specification describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims. Distributed data processing environment 100 includes computing device 110 and server computer 120 interconnected over network 130. In some embodiments, not depicted in FIG. 1, computing device 110 and server computer 120 may be the same device or operate on the same device.

Network 130 may be, for example, a storage area network (SAN), a telecommunications network, a local area network (LAN), a wide area network (WAN), such as the Internet, a wireless technology for exchanging data over short distances (using short-wavelength ultra-high frequency (UHF) radio waves in the industrial, scientific and medical (ISM) band from 2.4 to 2.485 GHz from fixed and mobile devices, and building personal area networks (PANs) or a combination of the three), and may include wired, wireless, or fiber optic connections. Network 130 may include one or more wired and/or wireless networks that may receive and transmit data, voice, and/or video signals, including multimedia signals that include voice, data, text and/or video data. In general, network 130 may be any combination of connections and protocols that will support communications between computing device 110 and server computer 120, and any other computing devices and/or storage devices (not shown in FIG. 1) within distributed data processing environment 100.

In some embodiments of the present invention, computing device 110 may be, but is not limited to, a standalone device, a client, a server, a laptop computer, a tablet computer, a netbook computer, a personal computer (PC), a smart phone, a desktop computer, a smart television, a smart watch, a radio, a stereo system, a cloud based service (e.g., a cognitive cloud based service), AR glasses, a virtual reality headset, any HUD known in the art, and/or any programmable electronic computing device capable of communicating with various components and devices within distributed data processing environment 100, via network 130 or any combination therein. In general, computing device 110 may be representative of any programmable computing device or a combination of programmable computing devices capable of executing machine-readable program instructions and communicating with users of other computing devices via network 130 and/or capable of executing machine-readable program instructions and communicating with server computer 120. In some embodiments computing device 110 may represent a plurality of computing devices.

In some embodiments of the present invention, computing device 110 may represent any programmable electronic computing device or combination of programmable electronic computing devices capable of executing machine readable program instructions, manipulating executable machine-readable instructions, and communicating with server computer 120 and other computing devices (not shown) within distributed data processing environment 100 via a network, such as network 130. Computing device 110 may include an instance of user interface (interface) 106, and local storage 104. In various embodiments, not depicted in FIG. 1, computing device 110 may have a plurality of interfaces 106. In other embodiments, not depicted in FIG. 1, distributed data processing environment 100 may comprise a plurality of computing devices, plurality of server computers, and/or one a plurality of networks. Computing device 110 may include internal and external hardware components, as depicted, and described in further detail with respect to FIG. 20

User interface (interface) 106 provides an interface to the pipeline optimization component (component) 122. Computing device 110, via user interface 106, may enable a user and/or a client to interact with component 122 and/or server computer 120 in various ways, such as sending program instructions, receiving program instructions, sending and/or receiving messages, updating data, sending data, inputting data, editing data, collecting data, and/or receiving data. In one embodiment, interface 106 may be a graphical user interface (GUI) or a web user interface (WUI) and may display at least text, documents, web browser windows, user options, application interfaces, and instructions for operation. interface 106 may include data (such as graphic, text, and sound) presented to a user and control sequences the user employs to control operations. In another embodiment, interface 106 may be a mobile application software providing an interface between a user of computing device 110 and server computer 120. Mobile application software, or an "app," may be designed to run on smart phones, tablet computers and other computing devices. In an embodiment, interface 106 may enable the user of computing device 110 to at least send data, input data, edit data (annotations), collect data and/or receive data.

Server computer 120 may be a standalone computing device, a management server, a web server, a mobile computing device, one or more client servers, or any other electronic device or computing system capable of receiving, sending, and processing data. In other embodiments, server computer 120 may represent a server computing system utilizing multiple computers such as, but not limited to, a server system, such as in a cloud computing environment. In another embodiment, server computer 120 may represent a computing system utilizing clustered computers and components (e.g., database server computers, application server computers, etc.) that act as a single pool of seamless resources when accessed within distributed data processing environment 100. Server computer 120 may include internal and external hardware components, as depicted, and described in further detail with respect to FIG. 20. In some embodiments server computer 120 may represent a plurality of server computers.

Each of shared storage 124 and local storage 104 may be a data/knowledge repository and/or a database that may be written and/or read by one or a combination of component 122, server computer 120 and computing device 110. In the depicted embodiment, shared storage 124 resides on server computer 120 and local storage 104 resides on computing device 110. In another embodiment, shared storage 124 and/or local storage 104 may reside elsewhere within distributed data processing environment 100, provided that each may access and is accessible by computing device 110 and server computer 120. Shared storage 124 and/or local storage 104 may each be implemented with any type of storage device capable of storing data and configuration files that may be accessed and utilized by server computer 120, such as, but not limited to, a database server, a hard disk drive, or a flash memory.

In the depicted embodiment, component 122 is executed on computing device 110. In other embodiments, component 122 may be executed on server computer 120. In various embodiments of the present invention, not depicted in FIG. 1, component 122 may execute on a plurality of server computers 120 and/or on a plurality of computing devices 110. In some embodiments, component 122 may be located and/or executed anywhere within distributed data processing environment 100 as long as component 122 is connected to and/or communicates with computing device 110 and/or server computer 120, via network 130.

In the depicted embodiment, component 122 comprises debugger component (debugger 126) and remediator component (remediator) 128). Further, in the depicted embodiment, debugger 126 and remediator 128 each execute on component 122 within computing device 110. In other embodiments, debugger 126 and remediator 128 each execute on component 122 within server computer 120. However, in other embodiments, not depicted in FIG. 1, debugger 126 and remediator 128 may each execute anywhere within distributed data processing environment 100 of FIG. 1 as long as debugger 126 and remediator 128 communicate with sever computer 120 and/or computing device 110.

Component 122 may be an automated machine learning (ML) pipeline repair tool that retrieves and/or receives one or more ML pipelines from a user, local storage 104, and/or shared storage 124. Component 122 may generate pipeline instances and pipeline status from the one or more retrieved and/or received ML pipelines (e.g., original ML pipelines). In various embodiments, component 122 outputs a remediated pipeline that repairs errors in the original planned pipeline. In various embodiments, component 122 may output one or more remediated pipelines that repair one or more detected/identified pipeline errors. In some embodiments, the output remediated pipelines are displayed to a user, via computing device 110. In various embodiments, component 122 identifies one or more root causes, generates a ranked list of the identified one or more root causes, and outputs a ranked list of the identified one or more root causes to the user, wherein the output ranked list is a responsive prompt displayed on interface 106. In some embodiments, the generated root cause list is ranked based on one or more predetermined factors. In some embodiments, component 122 generates a ranked list base on the identified one or more root causes and one or more solutions for the identified one or more root causes (i.e., solutions) and displays a responsive prompt detailing the generated list to one or more users, via interface 106, wherein the responsive prompt query's the user to confirm, rejects, or customizes the generated ranked list of the identified one or more root causes and the one or more solutions. Responsive to receiving a response from the user, via interface 106, component 122 either implements the solutions or rejects and/or stores the solutions on local storage 104 and/or shared storage 124.

In the depicted embodiment, debugger component (debugger) 126 and remediator component (remediator) 128 execute on component 122. In other embodiments, debugger 126 and/or remediator 128 each executed on server computer 120. In various embodiments of the present invention, not depicted in FIG. 1, debugger 126 and/or remediator 128 may execute on a plurality of server computers 120 and/or on a plurality of computing devices 110. In some embodiments, debugger 126 and/or remediator 128 may each be located and/or executed anywhere within distributed data processing environment 100 as long as debugger 126 and/or remediator 128 are connected to and/or communicate with component 122, computing device 110, and/or server computer 120, via network 130.

Debugger 126 may automatically identify the root cause of the error for a ML pipeline when given pipeline instances, wherein remediator 128 uses the results generated from debugger 126 to automatically repair the original pipeline. In various embodiments, debugger 126 uses a satisfiability constraint, a maximization objective, and/or ML algorithm to identify one or more root causes of one or more errors for one or more ML pipelines. Component 122 improves the art by enabling the automation of debugging and remedy generation of ML pipelines which are both tedious and error-prone tasks for users (e.g., data scientists) to perform manually. The "root cause" is the formula over hyperparameter values and operator choices that are true if the instance failed (i.e., the cause of the error).

In various embodiments of the present invention, component 122, via debugger 126, retrieves and/or receives as input a planned pipeline and pipeline instances generated from the planned pipeline along with the pipeline status (i.e. success/fail). Debugger 126 may output one or more root causes of failure which is defined as a formula over the hyperparameter values and operator choices such that all instances comprising a negative status (e.g., failure status). In various embodiments, to implement debugger 126, a solver is needed to analyze for the failure causes. There are two main methods of implementing the solver: (i) using a satisfiability modulo theories (SMT) solver, and (ii) using machine learning models such as a decision tree. In various embodiments, remediator 128 retrieves and/or receives the root cause of failure from debugger 126 along with the original pipeline to automatically repair the original pipeline. In one particular embodiment, remediator 128 uses a rule-based system.

In various embodiments, component 122 detects potential errors in a machine learning pipeline and automatically corrects the detected errors. Component 122 may correct the detected errors, and improve the art by (i) receiving by a computing device a target machine learning pipeline, (ii) generating by the computing device a plurality of test machine learning pipelines instances based upon the target machine learning pipeline, (iii) evaluating by the computing device the plurality of test machine learning pipeline instances for success or failure in a task, (iii) determining by the computing device based upon the evaluated plurality of test machine learning pipeline instances and the success or failure in the task one or more root causes of error, and (iv) creating by the computing device a repaired target machine learning pipeline based upon the one or more root causes of error.

In various embodiments, component 122, via remediator 128, implements the remediated ML pipeline (i.e., repaired target machine learning pipeline) by using the remediated ML pipeline as input for one or more following rounds of automated machine learning (AutoML), wherein the one or more following rounds of AutoML receive and/or retrieve pipeline information from debugger 126. In various embodiments, component 122 outputs one or more remediated pipelines, wherein the one or more output remediated pipelines comprises a detailed explanation of remediated pipeline. For example, component 122 depicts and details the differences between the remediated pipeline and the original pipeline, the identified one or more root causes of corruption, and where the results were implemented in the original pipeline. In some embodiments, receiving one or more machine-learning pipelines, creating pipeline instances, and evaluating the pipeline instances are interleaved.

Figure 2:
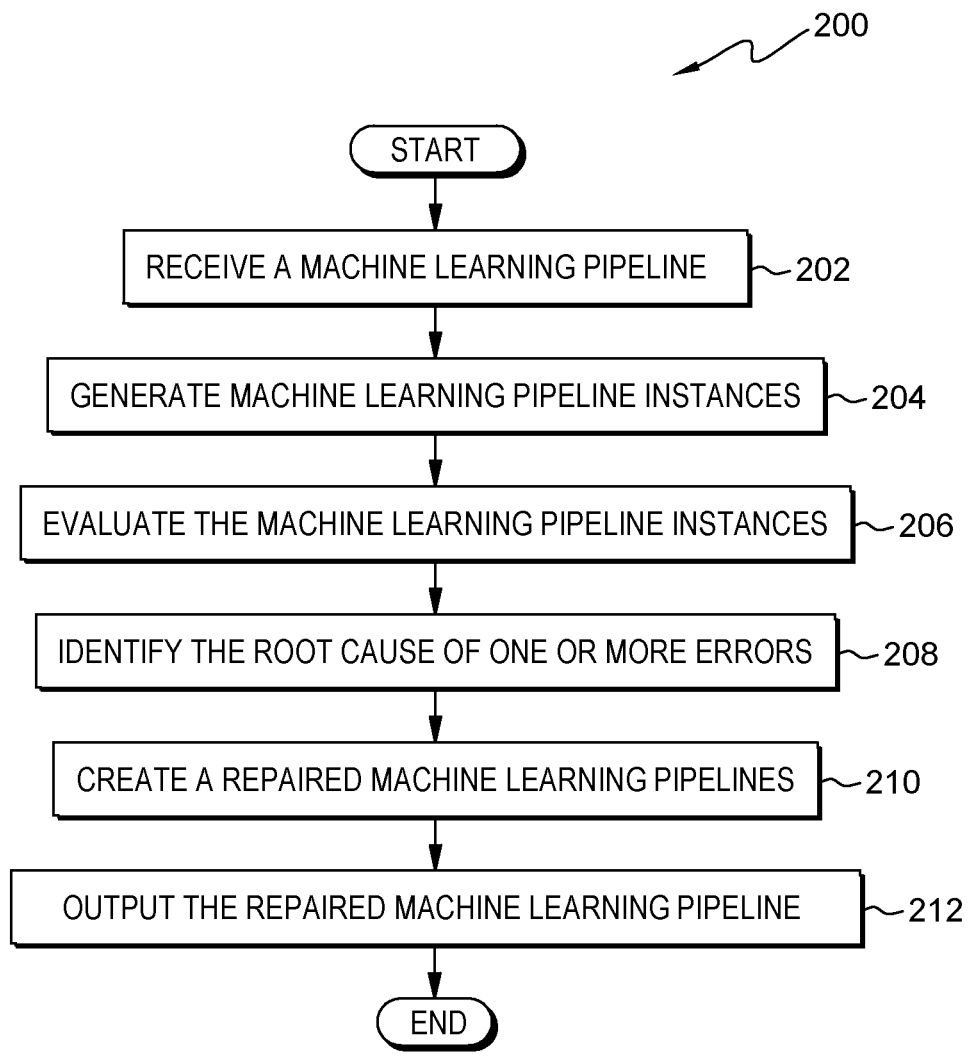
FIG. 2 illustrates operational steps of a pipeline optimization component, on a server computer within the distributed data processing environment of FIG. 1, for detecting and correcting machine learning pipeline errors, in accordance with an embodiment of the present invention.

FIG. 2 illustrates operational steps of component 122, generally designated 200, in communication with server computer 120 and/or computing device 110, within distributed data processing environment 100 of FIG. 1, for automatically detecting and correcting errors in one or more ML pipelines, in accordance with an embodiment of the present invention. FIG. 3 provides an illustration of one implementation and does not imply any limitations with regard to the environments in which different embodiments may be implemented. Many modifications to the depicted environment may be made by those skilled in the art without departing from the scope of the invention as recited by the claims.

In step 202, component 122 receives an ML pipeline. In various embodiments, component 122 receives and/or retrieves one or more ML pipelines from one or more users, local storage 104, and/or shared storage 124. In various embodiments, the received and/or retrieved one or more ML pipelines may be referred to as "original ML pipelines".

In step 204, component 122 generates ML pipeline instances for the received ML pipeline. In various embodiments, component 122 generates one or more ML pipeline instances for the received and/or retrieved one or more ML pipelines.

In step 206, component 122 evaluates the generated ML pipeline instances. In various embodiments, component 122 evaluates the one or more ML pipeline instances of the received and/or retrieved one or more ML pipelines.

In step 208, component 122 identifies the root cause of an error in the original ML pipeline. In various embodiments, component 122 identifies one or more root causes of one or more errors in one or more original ML pipelines.

In step 210, component 122 creates a repaired ML pipeline. In various embodiments, component 122 creates one or more repaired ML pipelines based on the one or more identified root causes of the one or more errors in the one or more original ML pipelines.

In step 212, component 122 outputs the repaired ML pipeline to the user. In various embodiments, component 122 outputs, via interface 106, the one or more repaired ML pipelines to the user. In various embodiments, component 122 may automatically implement the one or more repaired ML pipelines. In some embodiments, the output remediated pipelines are displayed to a user, via computing device 110. In various embodiments, component 122 identifies one or more root causes, generates a ranked list of the identified one or more root causes, and outputs a ranked list of the identified one or more root causes to the user, wherein the output ranked list is a responsive prompt displayed on interface 106.

In some embodiments, the generated root cause list is ranked based on predetermined factors. In some embodiments, component 122 generates a ranked list of identified one or more root causes and one or more solutions for the identified one or more root causes (i.e., solutions) and displays a responsive prompt detailing the generated list to one or more users, via interface 106, wherein the responsive prompt query's the user to confirm, rejects, or customizes the generated ranked list of the identified one or more root causes and the one or more solutions. Responsive to receiving a response from the user, via interface 106, component 122 either implements the solutions or rejects and/or stores the solutions on local storage 104 and/or shared storage 124.

FURTHER COMMENTS AND/OR EMBODIMENTS

Some embodiments of the present invention recognize the following facts, potential problems, and/or potential areas for improvement with respect to the current state of the art.

1 Introduction

Some embodiments of the present invention consider a class of black-box deterministic optimization problems, which often arise in machine learning:

Artificial Intelligence (AI) is an exciting rising paradigm of software development that however also comes with a vast set of new challenges for developers. Challenges range from systemic such as a lack of education and training and difficulty in reproducibility to hidden technical debt to a need for fairness and controlling for bias. For individual AI developers developing software that train machine learning (ML) models, tasks for these AI developers often cover a wide range from data collection and cleaning to feature selection to training and evaluating models. These tasks are often highly entangled, where errors in earlier steps often have serious or insidious cross-cutting consequences. For example, even if the software in a particular AI system is technically correct, mis-labeled training data may cause the entire system to have unacceptable performance (this may even be done maliciously via a poisoning attack). Unacceptable performance may be defined as not outputting results within a predetermined range of acceptance. Consequences of errors span a wide range depending on the components that they affect, from hard faults to data corruption to incorrect or unintended functionality in the AI system. Similarly, the potential causes of errors are numerous, from the dataset used, derived features, hyperparameters, operators, and/or any other causes known in the art. This complexity in reasoning and tracking errors in AI systems makes debugging particularly difficult for individual AI developers (user(s)).

In various embodiments, component 122 focuses on the task of debugging a set of possible ML pipelines for a given dataset. Following the terminology of ML framework known in the art, various embodiments define an ML pipeline as a graph of operators and their hyperparameters. Once trained, an ML pipeline becomes an ML model that supports evaluation using metrics and predictions on new unseen data. For this work, embodiments consider planned pipelines, which specify a graph of ML operators and schemas for hyperparameters, but leave some choices open, such as concrete hyperparameter settings, or picking one of multiple operators at a given pipeline step. It is common practice to use an automated machine learning (AutoML) tool to explore the search space of choices in a planned pipeline to find the best configuration for a given dataset. Given a planned pipeline, a pipeline instance fills in all the choices, by picking operators from the set of available options and hyperparameter values from the domain of the corresponding schema. A pipeline instance is trainable, and can thus be turned into a model and evaluated against metrics for a given dataset. In the process of this AutoML search, multiple pipeline instances are generated and evaluated.

Embodiments of the present invention focus on debugging these planned pipelines because errors in these pipelines often propagate to the derived models. Additionally, the automated search often tries erroneous combinations of opera-tors and hyperparameters. Debugging the failures of a particular ML pipeline is particularly difficult and time-consuming due to the experimental nature of AI development along with the multitude of possible failure causes. Often, the lack of transparency and explain ability in AI development results in developers treating pipelines as "black boxes" and forcing a trial-and-error approach of testing by running models repeatedly. This is combined with a difficulty of localizing the error due to entanglement or hidden feedback loops. Rather than reason about the development process as a whole with all of its complexities when debugging, various embodiments embrace the iterative nature of AI development to more efficiently find and remediate bugs.

In various embodiments approach towards automatically debugging an ML pipeline is to combine automated machine learning (AutoML) with a satisfiability modulo theories (SMT) solver to generate, analyze, and remediate instances of a particular planned ML pipeline for a given task. The complexity and sheer amount of possible causes of failure makes manual debugging difficult. With AutoML, the amount of experiments to reason across when debugging only increases. In various embodiments system eases this burden on the AI developer by viewing de-bugging as a task of searching for constraints over a given space of operators and their hyperparameters, which is a natural fit for an SMT solver. In this way, in various embodiments system attempts to automatically determine which constraints of operators or hyperparameters pre-vent certain failures. By using these constraints and the original planned ML pipeline, various embodiments can generate a remediated pipeline that implements these constraints and therefore avoids these failures.

In various embodiments, component 122 is a ML Automated Remediation Oracle that automatically debugs ML pipelines and generates remediated pipelines based on AutoML experiment results. Various embodiments build on top of a Python-based open source AutoML interface named Lale that supports composing multiple operators from popular ML libraries such as scikit-learn into pipelines and then running hyperparameter optimizers such as Hyperopt across these pipelines. Given a user's ML pipeline and their initial AutoML generated experiments, if a portion of the experiments have failed, then the experiments are passed to Component 122 and analyzed by the solver for a set of constraints that avoid failures. Component 122 then uses these constraints to automatically return a remediated pipeline to the user. In various embodiments tool also provides a form of fault explanation for the given ML pipeline through displaying the differences between the original and remediated pipelines. In various embodiments the contributions of component 122 may comprise: (i) An approach for automated debugging of ML pipelines based on AutoML and SMT solvers; (ii) Automated remediation for ML pipelines; and (iii) Visual explanation of a localized fault via differencing the original and remediated pipeline. In various embodiments, component 122 is the first ML debugging tool that provides a full explanation and remediation round-trip.

2 Overview and Examples

This section uses examples to give a high-level description of component 122. The target persona a data scientist. In various embodiments, the data scientist (i.e., user) uses machine-learning libraries from an open document format notebook to build predictive models.

2.1 Detailed Example

Figure 13:
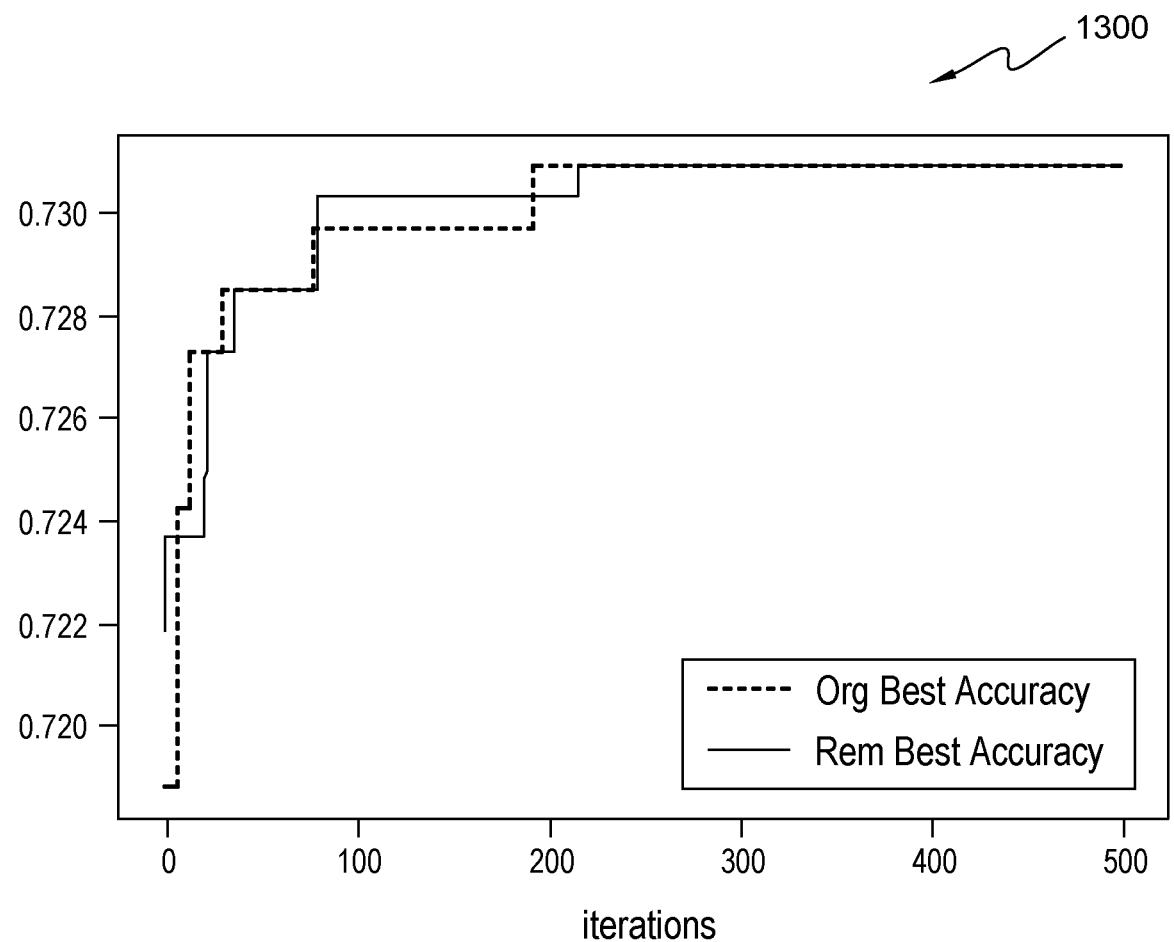
FIG. 13 contains exemplary graph, in accordance with an embodiment of the present invention.

In one example, when the user has inspected the data and found that it is missing values, categorical features, and discrete target labels. Therefore, the user assembles a planned pipeline with three steps: (i) a SimpleImputer for filling in missing values, (ii) a OneHotEncoder for transforming categoricals into numbers, and (iii) a LogisticRegression classifier for predicting target labels. Since not all categories are guaranteed to be represented in the training data, the user configures the one-hot encoder to ignore unknown cate-pipe combinator (>>) connects operators with dataflow edges, creating a pipeline, as depicted in FIG. 13.

Figure 14:
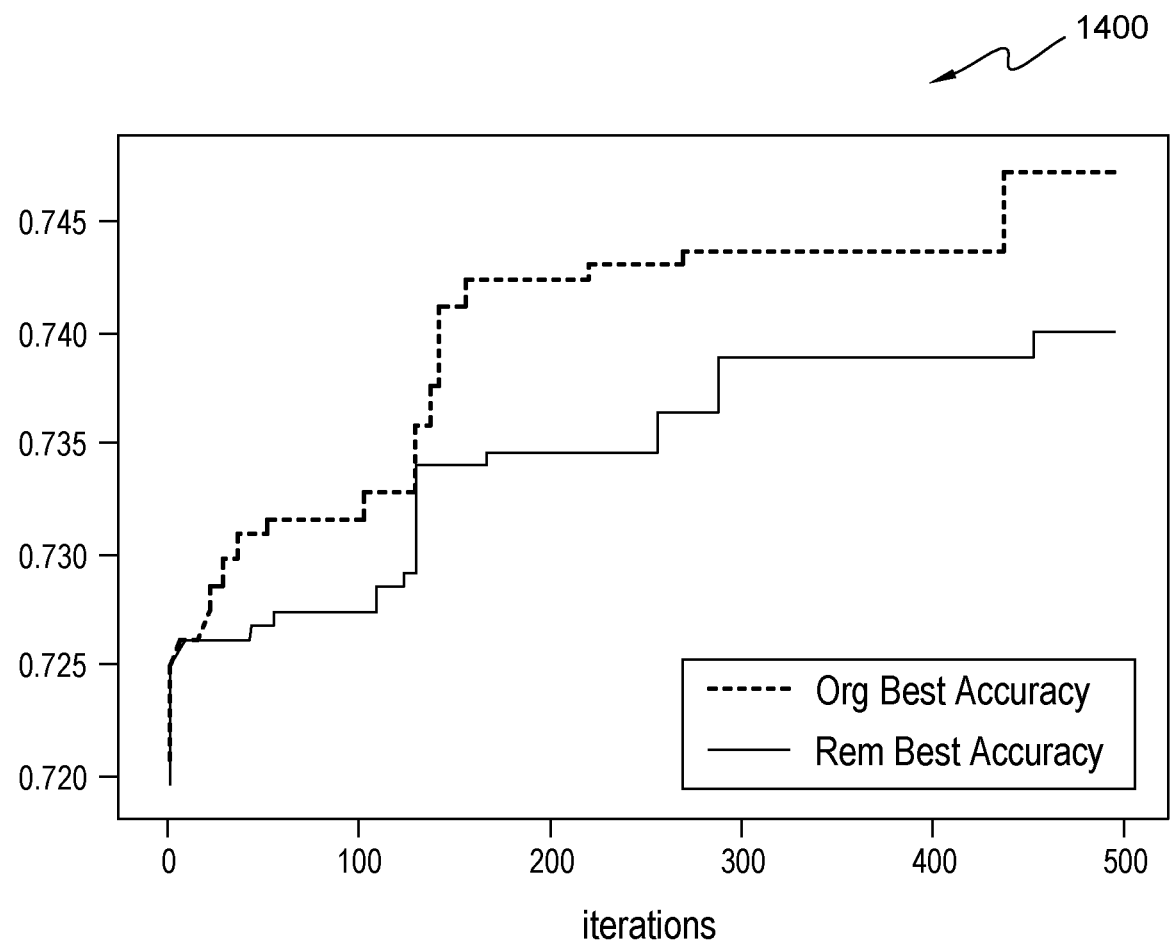
FIG. 14 contains exemplary graph, in accordance with an embodiment of the present invention.

The user's day-to-day workflow involves a lot of iterative trial and-error, as the user experiments with different pipelines to find the best-performing one. Rather than doing all experiments by hand, the user uses AutoML tools to auto-mate some of that search. In the example, both SimpleImputer and LogisticRegression have hyperparameters that the user deliberately left unspecified. Instead, the user uses Hyperopt to search possible configurations for them, based on hyperparameter schemas specified in the library. Another option, in this particular example, would have been to use grid-search, but even for two operators, there is a combinatorial explosion of hyperparameter values, so a Bayesian optimizer like Hyperopt is more effective. Each evaluation picks a pipeline instance (a pipeline where all hyperparameters are to values drawn from their schema) and evaluates it using cross-validation, as depicted in FIG. 14.

Unfortunately, most evaluations failed, i.e., the corresponding pipeline instance raised an exception. In this example, depicted in FIG. 14, what if there are root causes that the user should understand to build a better pipeline? Given how many evaluations failed, the search may be less effective, as it covered less ground. Moreover, the failures do not come for free: they may have wasted computational resources before raising their exceptions. Embodiments of the present invention recognize that this process can become very time consuming, since comparing even a moderate number of pipeline instances (e.g., the 20 depicted in FIG. 14) is tedious. For now, the user may call the summary( ) method as suggested by the error message, depicted in FIG. 5. Each evaluation in the summary has a name, ID, loss (in this case accuracy, negated to make it a minimization problem), log-loss, and status, as illustrated in FIG. 5. As expected, most pipeline instances failed. The user decides to retrieve one of them by name and pretty-print it as a particular programming language (e.g., Python code), as depicted in FIG. 6.

In various embodiments, Hyperopt comprises concrete hyperparameters, wherein the concrete hyperparameters are predetermined. The user could now look at all the other pipeline instances to find out which choices cause failures, or the user could try to train them and wade through their exception back-traces. Instead, the user asks component 122, the tool introduced by this paper, for guidance. Component 122 has three parts: debugger component 126, remediator component 128, and explainer component 129. The auto_remediate( ) function calls debugger component 126 and remediator component 128, taking the original planned pipeline and the evaluations from the Hyperopt run (pipeline instances and their status) and returning a new remediated pipeline. The remediated pipeline is as similar as possible to the original planned pipeline while ruling out all failures observed in earlier evaluations. Explainer component 129, implemented by pipeline_diff( ), compares two pipelines as a particular programing language (e.g., Python code), using syntax that the user is already familiar with, since the user used the same syntax to specify the planned pipeline in the first place. In various embodiments, the programing language can be predetermined or customized, as depicted in FIG. 7.

In various embodiments, the explanation pinpoints the cause of failure: the SimpleImputer should use the "most_frequent" strategy because the dataset is categorical, and other imputation strategies (such as ""median"") require numeric data. In one particular example, component 122 executes the remediated pipeline, wherein all 20 out of 20 evaluations succeed, as depicted in FIG. 8, which enables the user to return to finding the best pipeline for the dataset. Component 122 enables the user to evaluate the pipeline on test data, or perhaps use AutoML to search different classifier choices.

2.2 Tool Overview

Figure 9:
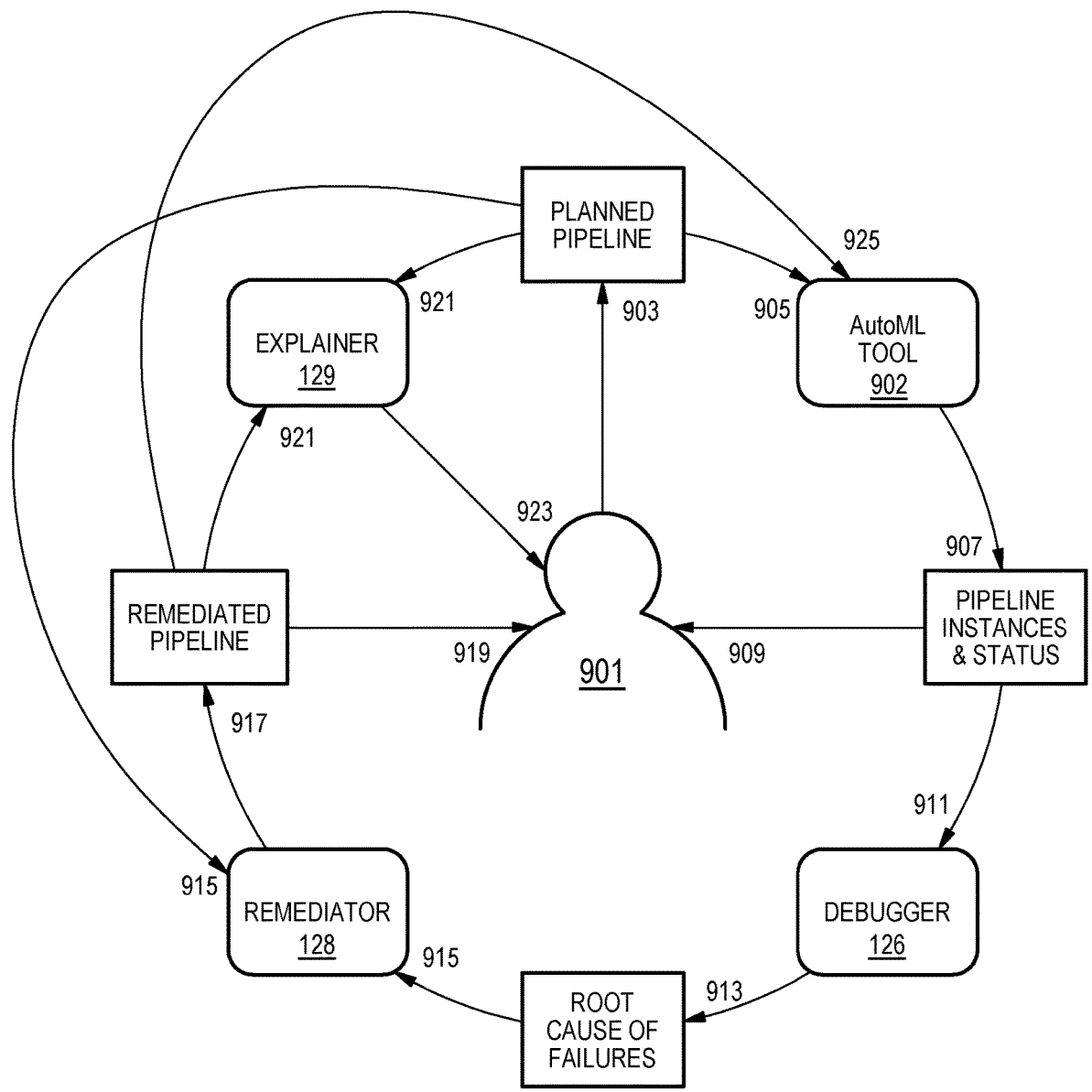
FIG. 9 illustrates dataflow of the pipeline optimization component, on a server computer within the distributed data processing environment of FIG. 1, for detecting and correcting machine learning pipeline errors, in accordance with an embodiment of the present invention.

FIG. 9 gives an overview of the workflow for component 122. In the depicted embodiment, the workflow starts with component 122 receiving data (e.g., a pipeline) from a data scientist (i.e., user 901), shown in the center. In 903, component 122 creates a planned pipeline. In 905, component 122, via AutoML tool 902, retrieves and/or receives the created planned pipeline, wherein AutoML tool 902 may be a grid search, Hyperopt, or any other backends that Lale supports. In 907, the automated search yields a set of pipeline instances along with their status, which can be either "ok" or "fail." In 909, component 122 outputs the set of pipeline instances, the pipeline instances statuses, and responsive prompts to user 901 in relation to the set of pipeline instances and pipeline instance status. In 911, component 122 sends the results (e.g., pipeline instances, the pipeline instances statuses, and/or responsive prompts) to debugger component 126. In 913, component 122, via debugger component 126, uses an SMT solver to find a root cause of the pipeline failures. In various embodiments the root cause identified in 913, along with the original planned pipeline, form the input to remediator component 128. In 915, remediator component 128 receives and/or retrieves input (e.g., the root cause identified in 913, along with the original planned pipeline) from component 122. In 917, remediator component 128 generates a remediated pipeline based on the received input in previous step, which is then output, by component 122, to user 901 for inspection if requested or desired, as demonstrated in 919. Alternatively, in 921, user 901 can send the remediated pipeline and the original pipeline to Component 122's explainer component 129, wherein, in 923, explainer component 129 component explains the remediation to the data scientist by rendering it as a diff. In 925, user 901 may use the remediated pipeline as the input to AutoML tool 902 instead of the original planned pipeline, thus completing the workflow circle.

2.3 Additional Examples

Component 122 can handle a diverse set of ML pipelines and associated failures. This section presents a representative list of examples. FIG. 10 shows problematic planned pipelines (written by a user) and the corresponding remediated pipelines (auto-generated by component 122). The examples are roughly ordered by difficulty, with the simplest first and the hardest last. Most remediations involve customizing the schema that specifies the search space for a hyperparameter. The following describes each of the examples from FIG. 10 in detail. FIG. 10 demonstrates how component 122 provides automated debugging, remediation, and explanation from the perspective of a data scientist. The experience may be integrated with the workflow and tools data scientists already use. The next section describes how Component 122 works internally.

In operator choice 1010, many scikit-learn estimators, including the LogisticRegression classifier, require that all input features are numeric. This example uses a CreditG dataset, where some features are numeric and others are categorical, represented by strings. The user can configure a Project operator to keep only the numeric features and drop the categorical ones. On the other hand, if the user specifies a search space with an operator choice (using the or combinator, |) between Project and NoOp, then only some evaluations use projection. The other evaluations fail, since LogisticRegression raises an exception when it encounters categorical features. The remediation is to remove the NoOp from the choice.

Boolean in transformer 1020 is a common approach for turning categorical features into numbers is to one-hot encode them, creating one feature for each possible category and setting exactly one of them to 1. This example, boolean in transformer 1020, uses a CreditG dataset, but this time, configures a Project operator to keep only categorical features. The second pipeline step is a OneHotEncoder. Since the output matrix contains mostly 0 values, it is represented using a sparse data structure. The problem with this pipeline is that the next step, StandardScaler, has a tunable hyperparameter with_mean, and when that is True, then the pipeline does not accept sparse data. Since the output from the one-hot encoder is sparse, every evaluation with StandardScaler(with_mean=True) fails. The remediation is to limit the search space for with_mean to {"enum": [False]}.

In enum in transformer 1030, embodiments demonstrated a simplified version of enum in transformer 1030 in Section 2.1. In this particular example, depicted in enum in transformer 1030, many ML operators have enumerative hyperparameters, typically represented by Python string constants. For example, scikit-learn's SimpleImputer has a strategy hyperparameter for which AutoML search will attempt "mean", "median", or "most_frequent." This example uses a variant of the CreditG dataset where 20% of randomly chosen values have been replaced by NaN, necessitating an imputer. For categorical columns, the SimpleImputer only works with strategy="most_frequent." The remediation is to limit the search space for that hyperparameter accordingly.

In enum in classifier 1040, the previous example concerned an enumerative hyperparameter in a transformer (in the data prepa-ration part of the pipeline), this example concerns a classifier (the final predictive step of the pipeline). The GradientBoostingClassifier has a loss hyperparameter for which AutoML tries "exponential" or "deviance." This example uses the PRNN-Cushings dataset, which is a four-way classification task. Unfortunately, the exponential loss only works for binary classification tasks, so all evaluations with loss="exponential" fail with an exception. The remediation is to limit the search space for loss to {"enum": ["deviance"]}.

In range in classifier 1050, the k-neighbors classifier has a hyperparameter k that specifies how many neighboring samples participate when voting for the output label. In scikit-learn, k is specified as n_neighbors. This example uses the PRNN-Cushings dataset, which is very small, with a total of only 27 samples. A good practice for AutoML is to perform an outer train-test split as well as an inner cross-validation split, further reducing the number of samples. The problem with this pipeline is that n_neighbors can be at most the total number of samples in the folds of the training split. All evaluations where AutoML picks a higher value fail. The remediation is to limit the search space for n_neighbors to {"minimum": 1, "maximum": 16.5, "type": "integer"}.

In multiple hyperparameters 1060 the remediations in the previous examples involved at most one hyperparameter, in this example, it involves two hyperparameters of the same operator. The dataset for this example is Digits from sklearn.datasets.load_digits. This dataset has 64 features, so the planned pipeline uses a PCA opera-tor for dimensionality reduction. The problem is that when AutoML configures the whiten hyperparameter to True and the svd_solver hyperparameter to "arpack", then the output dataset from PCA contains some NaN values. For those evaluations, LogisticRegression raises an exception. The remediation is to provide a choice between two ways to configure PCA, such that whiten=True never occurs together with svd_solver="arpack". This remediation uses the logical connectives "allOf" and "not" from JSON schema and the choice combinator |from Lale in the AutoML pipeline specification.

In multiple operators 1070, the problem for this example involves more than one operator, and the remediation consists of a coordinated multi-operator change to the pipeline. This example again uses the Digits dataset. This time, the pipeline contains two opera-tors for dimensionality reduction: PCA followed by SelectKBest. Both have a hyperparameter for the number of features to keep, called n_components and k, respectively. However, if PCA reduces the number of features to a certain number, that number becomes the de-facto maximum for SelectKBest. Setting PCA.n_components<SelectKBest.k triggers an exception. Since this kind of inequality constraint cannot be expressed directly in any AutoML library various embodiments are aware of, Component 122's remediation enforces it indirectly by picking 3 partitions of the space of values, making sure that the ranges are non-overlapping in each partition.

3 Automated Debugging, Remediation, and Explanation

As shown in FIG. 9, Component 122 comprises three components: (i) debugger component 126 that, given a set of evaluations, computes a root cause of failures, i.e., operator choices and hyperparameter settings that correlate with pipeline instances that failed, (ii) remediator component 128 that, given the original planned pipeline and the root cause of failures, constructs a new pipeline that excludes known failures while allowing other settings, and (iii) explainer component 129 that, given the original planned pipeline and the remediated pipeline, computes an explanation that makes the fix easier to understand for the data scientist.

Embodiments begin with some preliminaries defining the formats of pipelines and hyperparameter settings with which component 122 communicates with a front end tool such as a Jupyter notebook, and of the failure cause which debugger component 126 communicates to remediator component 128. Various embodiments then present how debugger component 126, remediator component 128, and explainer component 129 work.

3.1 Preliminaries

The input to component 122 consists of a set of evaluations, which are pipeline instances along with their status, for debugger component 126; plus the original planned pipeline, for remediator component 128 and explainer. the user, various embodiments define more precisely how the front end communicates this input to component 122.

A planned pipeline is a directed acyclic graph. The edges represent dataflow, and each node (or step in scikit-learn terminology) consists of one or more ML operators. When a step contains a choice between multiple operators, that means the data scientist leaves algorithm selection for that step to the AutoML tool. Debugger component 126 only needs the nodes, not the edges, of the graph.

Definition 3.1 (Pipeline). A pipeline P is a set of steps $S_0, \ldots, S_n$, which can be accessed by their name using P(name)=S where id(S)=name.

Like a planned pipeline, a pipeline instance also has steps, but now each step is concrete, i.e., a single concrete ML operator that has concrete hyperparameter settings.

Definition 3.2 (Pipeline instance). A pipeline instance p is a set of concrete steps $S_0, \ldots, S_n$ and a Boolean outcome r(p), which denotes success or failure of the pipeline.

To simplify the discussion, various embodiments will model operator choice for algorithm selection as if there were an additional indicator hyper-parameter whose value identifies the chosen concrete operator.

Definition 3.3 (Step). A step S consists of an id id≡id(S) and, for pipeline instances, a set H of hyperparameter settings, which denote the configuration of that step.

The output from debugger component 126 and the input to remediator component 128 is a root cause of failures, which is a formula that involves one or more constraints.

Definition 3.4 (Constraint). A constraint C=⟨param, op, value⟩ is a tuple where param is a hyperparameter name, op is one of the comparison operators =, <, >, ≤, ≥, and value can be an integer, a real, a Boolean, a string, or another hyperparameter name.

3.2 Debugging

Component 122 receives a set of pipeline instances $\mathcal{P}$, P1, ..., Pn, and computes a combination of hyperparameter constraints $C_1, \ldots, C_n$ that determine if a pipeline instance fails. In various embodiments constraints need to be able to handle a wide variety of cases—multiple linked constraints, arbitrary numerical constraints, constraints between hyperparameters, string constraints—and the individual hyperparameters can have multiple types of value at times, meaning various embodiments need type-dependent code to generate them. In various embodiments the solver-aided language Rosette [19] is used, which is embedded in the Racket dialect of Scheme and naturally handles in various embodiments dynamically-typed problem. Rosette generates formulae in SMTLib v2, which handles a range of types; dynamic typing is handled by Rosette using the flexibility of Scheme.

Solver-aided languages allow programming with symbolic values. At an intuitive level, symbolic values can be used for any program value, and the result of running such a program is a logical formula that, when solved, yields concrete values for the given symbolic ones such that the program runs correctly.

This allows us to simply write logic that checks whether a given constraint explains all failures, leaving the actual constraint symbolic so that it is filled in by the solver. To see how this works, consider the example from Section 2.1, where SimpleImputer with hyperparameter strategy set to "median" breaks on non-numeric data in the dataset. If various embodiments somehow knew the constraint to use, various embodiments could write the following:

$$C(\mathcal{P}) \equiv \forall_{p \in \mathcal{P}} \left( \begin{array}{l} r(p) \Leftrightarrow \\ \neg \langle SimpleImputer.strategy, \text{"median"} \rangle \in H(p) \end{array} \right) \quad \text{Equation 1}$$

This formula states that a pipeline instance from $\mathcal{P}$ succeeds if and only if it does not bind SimpleImputer.strategy to "median". If various embodiments think of C as a program that returns a Boolean, it will return true when run on the example from Section 2, and thus diagnose its problem. This would be simple to do; however, various embodiments do not, in general, know in advance what hyperparameter to check. But symbolic variables in Rosette allow us to write the following:

$$S1(\mathcal{P}) \equiv \forall_{p \in \mathcal{P}} (r(p) \Leftrightarrow \langle @hyper, @value \rangle \in H(p)) \quad \text{Equation 2}$$

This symbolic program is run by the solver as solve (assert (S1 (P)))1 and returns a model, if one exists, that binds the symbolic variables @hyper and @value to concrete values that make the assertion true. This will find any hyperparameter setting that correlates exactly with pipelines that fail. In fact, this simple logic suffices for any failure caused by a single value of a single hyperparameter.

A special case is when the mere presence of the hyperparameter is enough to cause failure, meaning that that pipeline step may be removed. Failed runs have this hyperparameter and successful ones do not, meaning they do not have the step at all. This can be expressed by quantifying over the value:

$$S2 \equiv \forall_{p \in \mathcal{P}} (\neg r(p) \Leftrightarrow \langle @hyper, \exists v \cdot v \rangle \in H(p)) \quad \text{Equation 3}$$

This will find that all working configurations have n_neighbors≤16. Rosette supports both integer and real numbers and the usual operators on them, so this supports any numerical limit on a single hyperparameter.

But some problems involve constraints, typically numerical ones, between multiple hyperparameters. Consider the pipeline from FIG. 10 (e.g., 1070), where principal component analysis (PCA) reduces the number of features in a dataset and then SelectKBest chooses the best k features. To choose the k best, there may be at least k, so PCA may preserve enough. This requires a constraint that relates two hyperparameters:

$$S_4 \equiv \forall_{p \in \mathcal{P}} \left( r(p) \Leftrightarrow \left( \begin{array}{l} \langle @hyper_1, @value_1 \rangle \in H(p) \wedge \\ \langle @hyper_2, @value_2 \rangle \in H(p) \wedge \\ @value_1 @op @value_2 \end{array} \right) \right) \quad \text{Equation 4}$$

This will find that all successful pipeline instances from this example have PCA.n_components≤SelectKBest.k. As various embodiments shall see, though, this case is more complicated to remediate. It is simple to make a general solver as follows:

$$S_{any}(\mathcal{P}) \equiv S_1(\mathcal{P}) \vee S_2(\mathcal{P}) \vee S_3(\mathcal{P}) \vee S_4(\mathcal{P}) \quad \text{Equation 5}$$

However, these constraints all assume that the same settings are needed across all pipelines, and that is not always the case. Consider multiple hyperparameters 1060, in which the combination whiten and the "arpack" solver breaks for this dataset. Either is allowed, but they cannot be used together. To handle this, various embodiments stack these constraints such that one constraint controls which other constraint applies; the superscripts on S indicate that the three uses of S generate distinct symbolic variables, so there are three independent constraints:

$$S_4 \equiv \forall_{p \in \mathcal{P}} \left( r(p) \Leftrightarrow \left\{ \begin{array}{ll} S^2_{any}(\{p\}) & \text{if } S^1_{any}(\{p\}) \\ S^3_{any}(\{p\}) & \text{otherwise} \end{array} \right\} \right) \quad \text{Equation 6}$$

The solver could make this a program in which $S^1$ checks that whiten is true and $S^2$ checks that solver is not "arpack." This only illustrates two levels, but clearly they can be stacked as deeply as needed. To communicate results from the debugger to the remediator, the symbolic constraint of each Si is provided as a set of bindings of its symbolic variables.

3.3 Remediation

Remediation involves customizing pipeline steps based on the con-straints found by the debugging phase. Each constraint applies to operator choices and hyperparameters of all the pipeline instances given to the solver, and remediation means applying that constraint to the planned pipeline itself and sending the modified pipeline back to the front end. The remediation is handled differently for each type of symbolic constraint; in all cases, various embodiments need to extract the bindings of symbolic variables for a constraint S, which various embodiments write as S(<var>). In pipelines that use a tree of constraints, various embodiments will apply multiple remediations. Various embodiments discuss the constraints below:

(i) the $S_1$ remediation involves adding a concrete value to con-strain a specific hyperparameter of a step of the pipeline. Recall that hyperparameter names, in in various embodiments convention, include the step name, so various embodiments modify P(step(S(@hyper))) to add the constraint that S(@hyper)=S(@value), (ii) the $S_2$ remediation involves removing the step that uses this hyperparameter, since all pipeline instances that had it failed. Since various embodiments have some successes, this step may be optional, so it may be contained within an operator choice (written | in in various embodiments pipelines). Various embodiments take the choice that is the parent of P(step(S(@hyper))) and remove the step, (iii) the $S_3$ remediation is much like the one for $S_1$, since it involves adding a constraint to a single hyperparameter of a single step, wherein the constraint involves an operator and a value, so various embodiments modify P(step(S(@hyper))) from the planned pipeline to add the constraint that S(@hyper)S(@op)S(@value), and (iv) the $S_4$ remediation is trickier, since various embodiments can only add constraints for a single step, wherein in various embodiments the approach is to create multiple new pipelines that choose values across the range allowed by both steps, and then create multiple pipelines that constrain each of the two steps based on those values.

3.4 Explanation

In various embodiments, component 122 receives instructions from a user that the explanations component 122 produces use familiar syntax, be concise, and refer only to things that the user has control over or authorization to access. The latter is taken care of by Component 122's remediation, which takes a black-box approach (no tracing into operator implementations or into dataset characteristics). That leaves familiarity and conciseness. Initially, for conciseness, various embodiments just printed the logic formula that comes back from the SMT solver. In various embodiments component 122 comprises pretty-printer for pipelines that is optimized for readability and ease of diffing. Specifically, in various embodiments pretty-printer introduces intermediate variables for interesting operator configurations, with a standard naming scheme to prevent spurious differences. To make sure the pretty-printed code can be trusted, component 122 may output and execute created extensive round-trip tests, asserting that the result of print+eval+print is the same as the result of a single print. This was helpful especially for sophisticated cases such as pretty-printing calls to customize schema.

With the pretty-printing feature in hand, component 122 may enable one or more users to inspect the entire remediated pipeline, which is often useful in and of itself. But sometimes users find this format not concise enough, as it makes it tedious to do the diff against the original planned pipeline in their mind. So in addition, various embodiments implemented the pipeline_diff functionality that was demonstrated in Section 2.1. It simply pretty-prints both the original planned pipeline and the remediated pipeline to strings, then uses an off-the-shelf diffing library on them, and finally renders the result using Markdown highlighting in a notebook.

4 Evaluation

This section uses case studies and an empirical evaluation to address the following research questions (RQ(s)): RQ1: How does component 122's remediation affect correctness?; RQ2: Is the time taken for component 122's remediation short enough to feasibly be used interactively?; and RQ3: How does component 122's remediation affect accuracy?

4.1 Correctness (RQ1)

In various embodiments, component 122 is inherently a correctness tool: given a set of evaluations, some of which are incorrect, it locates the fault and repairs the planned pipeline. By construction, after the mitigation, the search space no longer includes pipeline instances that failed before, so in that sense, it is trivially more correct. However, when a new AutoML search is launched, it may attempt configurations that component 122 has not seen before. And there is no a-priori guarantee that those new configurations do not fail in new ways. Given that component 122 supports a full round-trip, various embodiments could simply apply it again in that case. But it is still interesting to ask how many failures remain after a single remediation.

FIG. 11 shows correctness results for the seven example pipelines from FIG. 2. In various embodiments, component 122 report the number of failures in the original 20 evaluations, as well as another AutoML search with 20 evaluations after remediation. In all cases, the second search is failure-free. Since it is possible that there are still rare failures that only manifest with a large number of runs, various embodiments repeat the same experiment with 500 evaluations. But various embodiments still observe no post-remediation failures.

4.2 Interactivity (RQ2)

In various embodiments component 122 to be used interactively such that once a user attempts to debug and remediate a given pipeline, the user should expect that the response will return quickly, at least orders of magni-tudes faster than the original training or AutoML job. Data scientists already tend to work in an iterative, experimental fashion which is inherently time-consuming [9]. Given that AutoML jobs have their own time costs as well, various embodiments expect that debugging tools with significant time costs would have limited usefulness due to the already-limited time constraints of data scientists.

FIG. 12 shows the average time taken to remediate the seven example pipelines from FIG. 2. In various embodiments two cases of remediations were run for each planned pipeline: one where 20 original evaluations are input to component 122 and another where 50 original evaluations are input. In various embodiments each experiment was run five times and reported, wherein the average time taken in seconds. The results indicate that increasing the number of evaluations for the debugger component to consider does increase the time it takes to remediate the pipeline. However, in various embodiments also find that the overall time taken to return a remediation is still below 15 seconds in all cases which various embodiments expect is fast enough such that the user can immediately observe and act upon the remediation.

4.3 Accuracy (RQ3)

Although component 122 focuses on correctness, it may be balanced with performance on the given dataset. Since component 122 is designed to work with AutoML tools, it is possible that the remediation may remove too much of the potential search space in order to guarantee a correct pipeline. In various embodiments the new AutoML searches on the remediated pipeline may be expected to also perform poorly. In various embodiments, component 122 enables the comparison of the AutoML performance of the original pipeline to the remediated pipeline provided by component 122 in terms of test set accuracy for each of various case studies.

For the performance evaluations, two AutoML jobs may be run, wherein the two AutoML jobs comprise the original pipeline and the remediated pipeline returned by component 122 after 20 evaluations. Various embodiments use a training and test split of 80% and 20% for the given dataset and run each AutoML job five times for 500 iterations. For each of the five runs, the dataset is split using stratified sampling such that each of the five runs has a unique set of elements in their training and test sets. In various embodiments, component 122 reports the best test set accuracy per iteration averaged across the five AutoML runs for both the original and remediated pipeline by outputting a diagnostic report to one or more users via interface 106. Across the seven examples above, various embodiments see that the original and remediated pipelines have similar performance with exceptions in FIG. 14 where the original outperforms the remediated pipeline and FIG. 15 where the remediated pipeline outperforms the original.

5 Threats to Validity

While Component 122 has been shown to handle a diverse range of error cases, there may be limitations that appear to restrict its applicability; however, various embodiments detailed below, demonstrate they can overcome.

Some limits appear to be that various embodiments show seven working remediations based on fin various embodiments formulae, but the key observation here is that the set of formulae that various embodiments use could be easily extended. For instance, making a formula to catch relationships among fin various embodiments hyperparameters would be a straightforward extension of S4. Similarly, while S5 involves three constraints, which is arbitrary, various embodiments could easily add more. Hence, various embodiments demonstrate that this is not a limitation of the approach, merely of the current status of in various embodiments prototype, as various embodiments can easily add any important cases.

Various embodiments do assume determinism in the kinds of failures that various embodiments can handle; however, the underlying Rosette machinery supports MaxSMT, in which the SMT solver can optimize to maximize an outcome. That means that various embodiments could look for settings that address a noisier outcome metric than raised exceptions, such as accuracy, fairness, or performance.

Finally, in various embodiments results depend on a set of pipeline instances, so various embodiments could prune unseen cases that could work but have not been observed as successes among the known pipeline instances. Even with 20 pipeline instances, this has not been an issue. And, if it does happen, the solution here is to provide an adequate number of pipeline instances. This is a simple matter of configuring the AutoML tool for a higher number of iterations; the solver takes a reasonable amount of time even for 50 and can handle many more.

FIG. 3 contains exemplary algorithm 300, in accordance with an embodiment of the present invention.

FIG. 2 contains exemplary output message 400, in accordance with an embodiment of the present invention.

FIG. 5 contains exemplary output message 500, in accordance with an embodiment of the present invention.

FIG. 6 contains exemplary algorithm 600, in accordance with an embodiment of the present invention.

FIG. 7 contains exemplary algorithm 700, in accordance with an embodiment of the present invention.

FIG. 8 contains exemplary output message 800, in accordance with an embodiment of the present invention.

FIG. 9 illustrates dataflow of a pipeline optimization component, on a server computer within the distributed data processing environment of FIG. 1, for detecting and correcting machine learning pipeline errors, in accordance with an embodiment of the present invention.

FIG. 10A contains exemplary planned pipelines and their automated remediations, in accordance with an embodiments of the present invention.

FIG. 10B contains exemplary planned pipelines and their automated remediations, in accordance with an embodiments of the present invention.

FIG. 11 contains exemplary table 1100 describing the number of failures before and after mitigations, in accordance with an embodiment of the present invention.

FIG. 12 contains exemplary table 1200 describing the average time in seconds taken to remediate the pipelines depicted in FIG. 10. Table 1200 depicts the average time in seconds taken to remediate the pipelines depicted in FIG. 10 (i.e., operator choice 101, Boolean in transformer 1020, enum in transformer 1030, enum in classifier 1040, range in classifier 1050, multiple hyperparameters 1060, and multiple operators 1070) when given twenty or fifty evaluations from each use case.

FIG. 13 contains exemplary graph 1300, in accordance with an embodiment of the present invention. Graph 1300 illustrates the comparison of an original remediation test set accuracy from operator choice 1010.

FIG. 14 contains exemplary graph 1400, in accordance with an embodiment of the present invention. Graph 1400 illustrates the comparison of an original remediation test set accuracy from boolean in transformer 1020.

Figure 15:
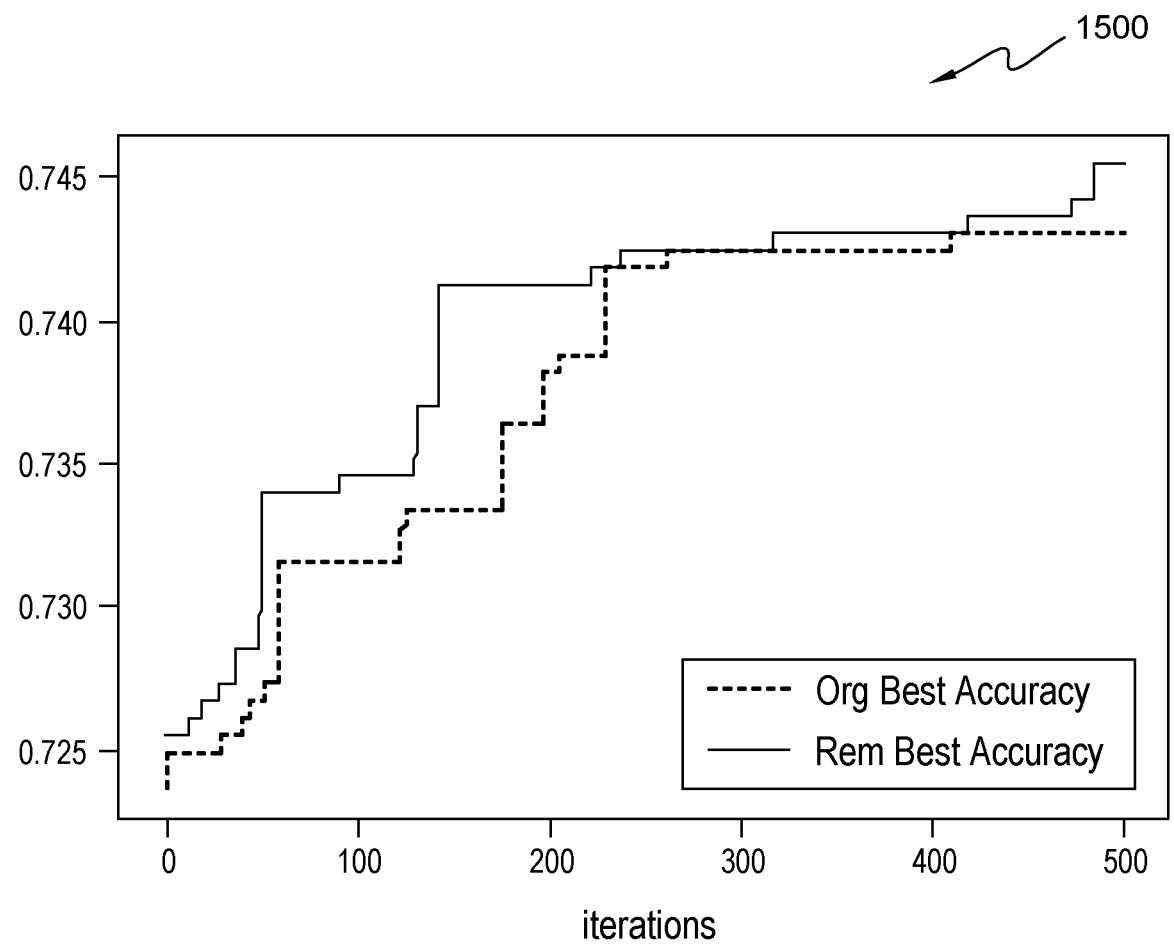
FIG. 15 contains exemplary graph, in accordance with an embodiment of the present invention.

FIG. 15 contains exemplary graph 1500, in accordance with an embodiment of the present invention. Graph 1500 illustrates the comparison of an original remediation test set accuracy from enum in transformer 1030.

Figure 16:
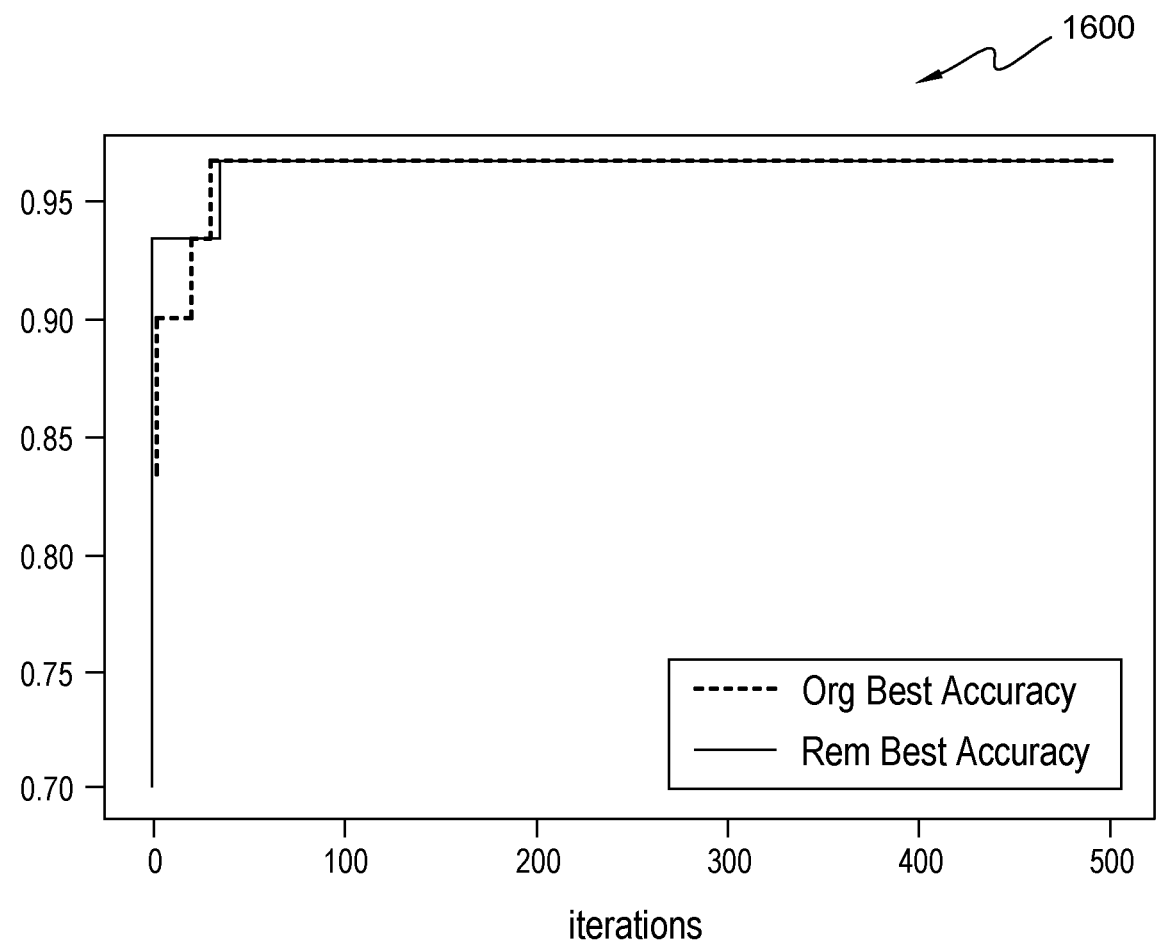
FIG. 16 contains exemplary graph, in accordance with an embodiment of the present invention.

FIG. 16 contains exemplary graph 1600, in accordance with an embodiment of the present invention. Graph 1600 illustrates the comparison of an original remediation test set accuracy from enum in classifier 1040.

Figure 17:
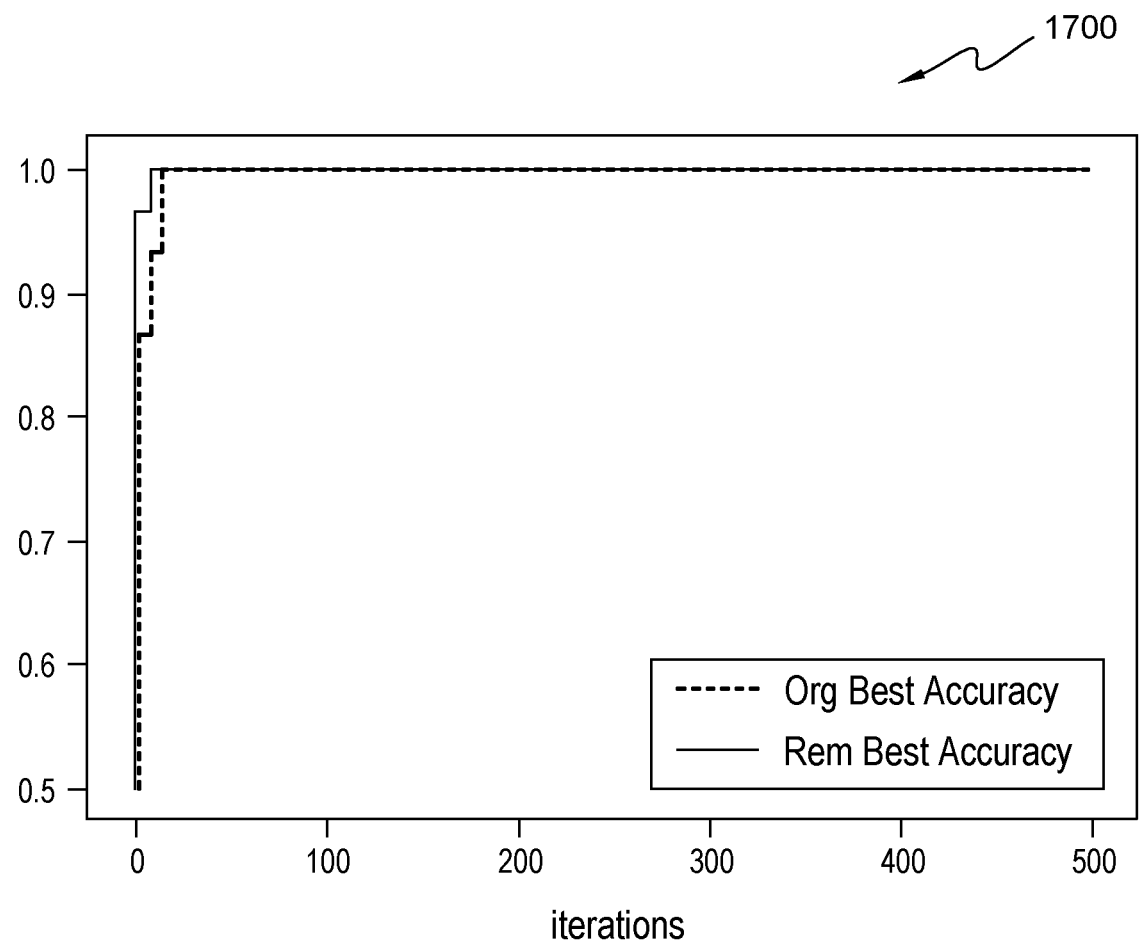
FIG. 17 contains exemplary graph, in accordance with an embodiment of the present invention.

FIG. 17 contains exemplary graph 1700, in accordance with an embodiment of the present invention. Graph 1700 illustrates the comparison of an original remediation test set accuracy from range in classifier 1050.

Figure 18:
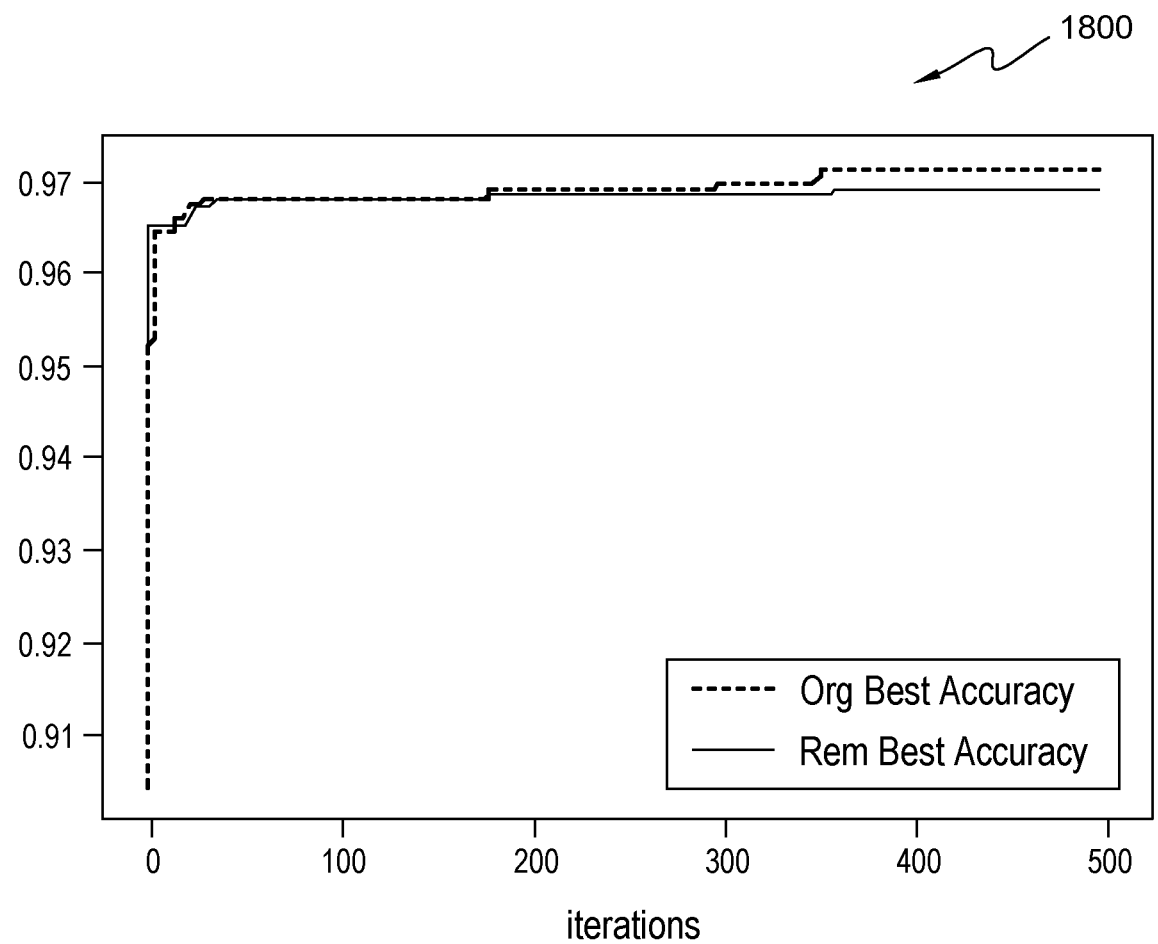
FIG. 18 contains exemplary graph, in accordance with an embodiment of the present invention.

FIG. 18 contains exemplary graph 1800, in accordance with an embodiment of the present invention. Graph 1800 illustrates the comparison of an original remediation test set accuracy from multiple hyperparameters 1060.

Figure 19:
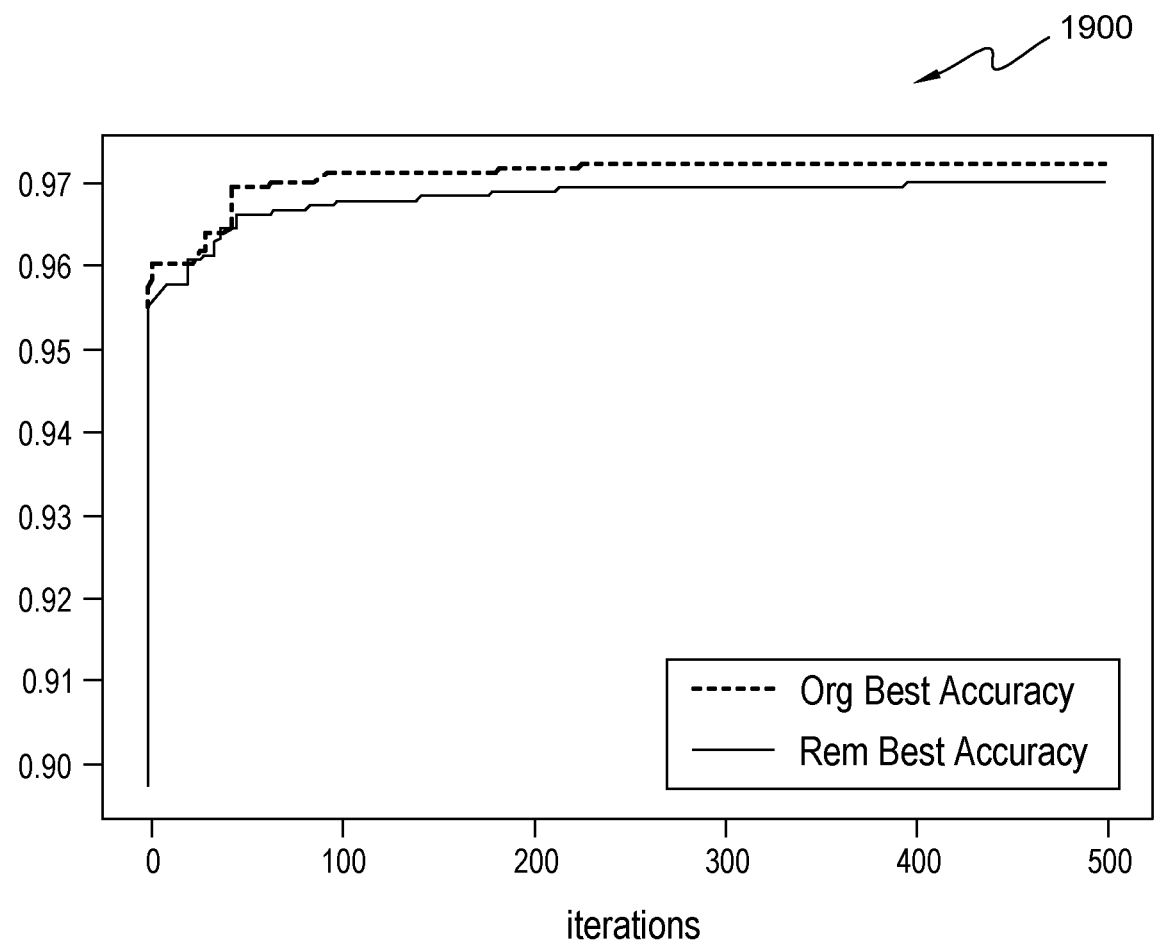
FIG. 19 contains exemplary graph, in accordance with an embodiment of the present invention.

FIG. 19 contains exemplary graph 1900, in accordance with an embodiment of the present invention. Graph 1900 illustrates the comparison of an original remediation test set accuracy from multiple operators 1070.

Figure 20:
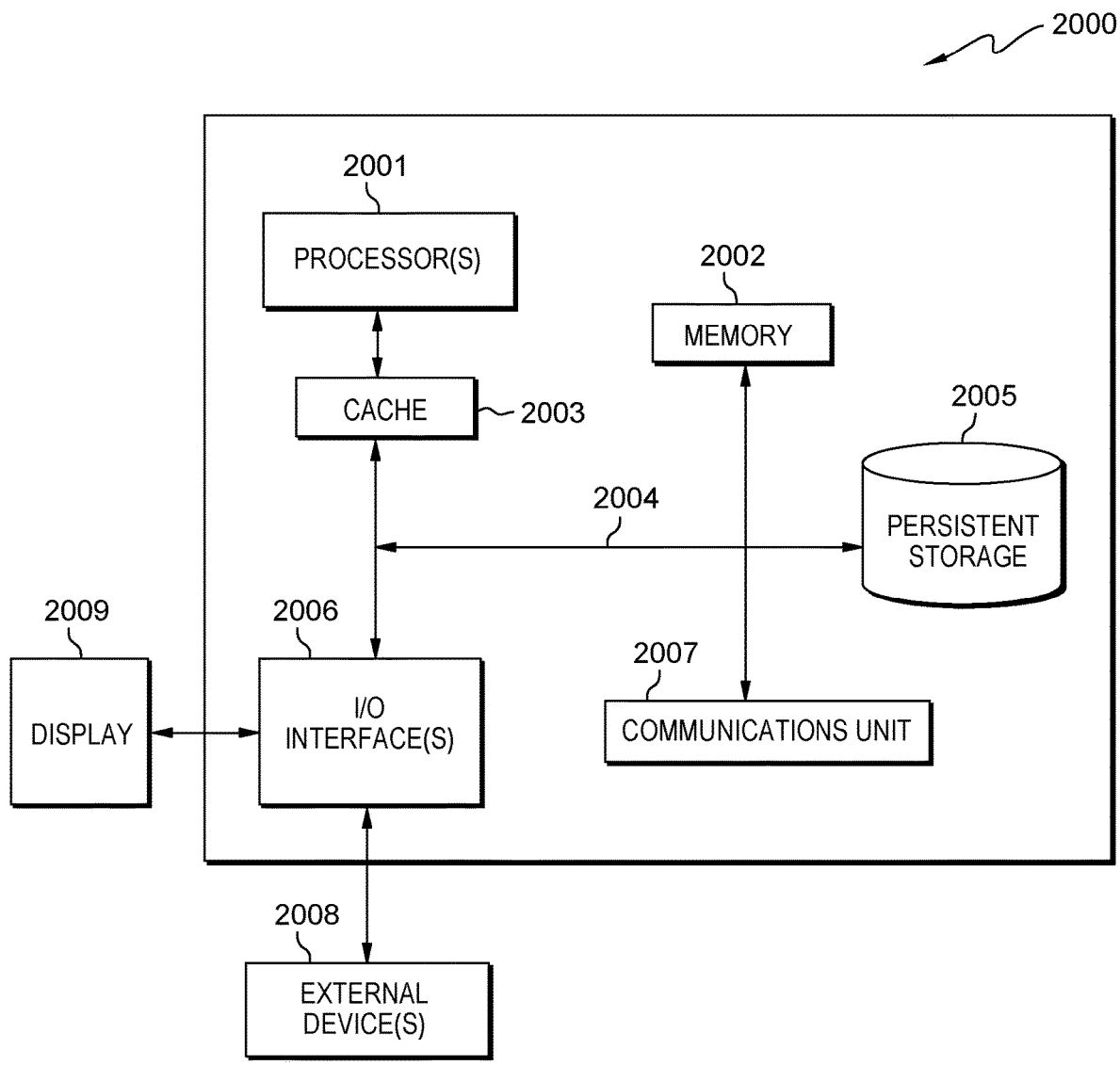
FIG. 20 depicts a block diagram of components of the server computer executing the modification component within the distributed data processing environment of FIG. 1, in accordance with an embodiment of the present invention.

FIG. 20 depicts a block diagram of components of server computer 120 within distributed data processing environment 100 of FIG. 1, in accordance with an embodiment of the present invention. It should be appreciated that FIG. 20 provides only an illustration of one implementation and does not imply any limitations with regard to the environments in which different embodiments may be implemented. Many modifications to the depicted environment may be made.

FIG. 20 depicts computer system 2000, where server computing 120 represents an example of computer system 2000 that includes component 122. The computer system includes processors 2001, cache 2003, memory 2002, persistent storage 2005, communications unit 2007, input/output (I/O) interface(s) 2006, display 2009, external device(s) 2008 and communications fabric 2004. Communications fabric 2004 provides communications between cache 2003, memory 2002, persistent storage 2005, communications unit 2007, and input/output (I/O) interface(s) 2006. Communications fabric 2004 may be implemented with any architecture designed for passing data and/or control information between processors (such as microprocessors, communications, and network processors, etc.), system memory, peripheral devices, and any other hardware components within a system. For example, communications fabric 2004 may be implemented with one or more buses or a crossbar switch.

Memory 2002 and persistent storage 2005 are computer readable storage media. In this embodiment, memory 2002 includes random access memory (RAM). In general, memory 2002 may include any suitable volatile or non-volatile computer readable storage media. Cache 2003 is a fast memory that enhances the performance of processors 2001 by holding recently accessed data, and data near recently accessed data, from memory 2002.

Program instructions and data used to practice embodiments of the present invention may be stored in persistent storage 2005 and in memory 2002 for execution by one or more of the respective processors 2001 via cache 2003. In an embodiment, persistent storage 2005 includes a magnetic hard disk drive. Alternatively, or in addition to a magnetic hard disk drive, persistent storage 2005 may include a solid-state hard drive, a semiconductor storage device, read-only memory (ROM), erasable programmable read-only memory (EPROM), flash memory, or any other computer readable storage media that is capable of storing program instructions or digital information.

The media used by persistent storage 2005 may also be removable. For example, a removable hard drive may be used for persistent storage 2005. Other examples include optical and magnetic disks, thumb drives, and smart cards that are inserted into a drive for transfer onto another computer readable storage medium that is also part of persistent storage 2005.

Communications unit 2007, in these examples, provides for communications with other data processing systems or devices. In these examples, communications unit 2007 includes one or more network interface cards. Communications unit 2007 may provide communications through the use of either or both physical and wireless communications links. Program instructions and data used to practice embodiments of the present invention may be downloaded to persistent storage 2005 through communications unit 2007.

I/O interface(s) 2006 enables for input and output of data with other devices that may be connected to each computer system. For example, I/O interface 2006 may provide a connection to external devices 2008 such as a keyboard, keypad, a touch screen, and/or some other suitable input device. External devices 2008 may also include portable computer readable storage media such as, for example, thumb drives, portable optical or magnetic disks, and memory cards. Software and data used to practice embodiments of the present invention may be stored on such portable computer readable storage media and may be loaded onto persistent storage 2005 via I/O interface(s) 2006. I/O interface(s) 2006 also connect to display 2009.

Display 2009 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium may be any tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures (i.e., FIG.) illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for detecting and correcting errors in one or more machine learning pipelines, the computer-implemented method comprising:

generating, by a computing device, a plurality of test machine learning pipeline instances based upon a target machine learning pipeline;

evaluating, by the computing device, the plurality of test machine learning pipeline instances for failure in a task;

identifying, by the computing device, one or more root causes of error based upon the evaluated plurality of test machine learning pipeline instances and failure in the task;

creating, by the computing device, a remediated target machine learning pipeline based upon the identified one or more root causes of error; and outputting the remediated machine learning pipeline that repairs the one or more root causes of error in the plurality of test machine learning pipeline instances, wherein the remediated machine learning pipeline depicts and details differences between the remediated machine learning pipeline and the plurality of test machine learning pipeline instances, the identified one or more root causes of corruption, and where the results were implemented in the plurality of test machine learning pipeline instances.

2. The computer-implemented method of claim 1, further comprising: receiving, by the computing device, the target machine learning pipeline.

3. The computer-implemented method of claim 1, further comprising: implementing the remediated machine learning pipeline by using the remediated machine learning pipeline as input for one or more automated machine learning instances.

4. The computer-implemented method of claim 1, further comprising: generating a ranked list of the identified one or more root causes; and outputting the ranked list to a user, wherein the output ranked list is a responsive prompt displayed on a user interface.

5. The computer-implemented method of claim 1, further comprising: generating a ranked list of the identified one or more root causes and one or more solutions for the identified one or more root causes; and displaying, by a user interface, a responsive prompt detailing the generated ranked list to one or more users, wherein the responsive prompt queries the one or more users to confirm, deny, or customize the generated ranked list of the identified one or more root causes and the one or more solutions.

6. The computer-implemented method of claim 5, further comprising: responsive to receiving a response from the user, through the user interface, implementing the one or more solutions or rejects; and storing the one or more solutions to a database.

7. The computer-implemented method of claim 1, wherein the outputted remediated machine learning pipeline comprises a detailed explanation of the remediated machine learning pipeline.

8. A computer system for detecting and correcting errors in one or more machine learning pipelines, the computer system comprising:
one or more computer processors;
one or more computer readable storage devices;
program instructions stored on the one or more computer readable storage devices for execution by at least one of the one or more computer processors, the stored program instructions comprising:
program instructions to generate a plurality of test machine learning pipeline instances based upon a target machine learning pipeline;
program instructions to evaluate the plurality of test machine learning pipeline instances for failure in a task;
program instructions to identify one or more root causes of error based upon the evaluated plurality of test machine learning pipeline instances and failure in the task;
program instructions to create a remediated target machine learning pipeline based upon the identified one or more root causes of error; and
program instructions to output the remediated machine learning pipeline that repairs the one or more root causes of error in the plurality of test machine learning pipeline instances, wherein the remediated machine learning pipeline depicts and details differences between the remediated machine learning pipeline and the plurality of test machine learning pipeline instances, the identified one or more root causes of corruption, and where the results were implemented in the plurality of test machine learning pipeline instances.

9. The computer system of claim 8, further comprising: program instructions to receive the target machine learning pipeline.

10. The computer system of claim 8, further comprising: program instructions to implement the remediated machine learning pipeline by using the remediated machine learning pipeline as input for one or more automated machine learning instances.

11. The computer system of claim 8, further comprising: program instructions to generate a ranked list of the identified one or more root causes; and program instructions to output the ranked list to a user, wherein the outputted ranked list is a responsive prompt displayed on a user interface.

12. The computer system of claim 8, further comprising: program instructions to generate a ranked list of the identified one or more root causes and one or more solutions for the identified one or more root causes; and program instructions to display a responsive prompt detailing the generated ranked list to one or more users, wherein the responsive prompt queries the one or more users to confirm, deny, or customize the generated ranked list of the identified one or more root causes and the one or more solutions.

13. The computer system of claim 12, further comprising: responsive to receiving a response from the user, through the user interface, program instructions to implement the one or more solutions or rejects; and program instructions to store the one or more solutions to a database.

14. The computer system of claim 8, wherein the outputted remediated machine learning pipeline comprises a detailed explanation of the remediated machine learning pipeline.

15. A computer program product for detecting and correcting errors in one or more machine learning pipelines, the computer program product comprising:
one or more computer readable storage devices and program instructions stored on the one or more computer readable storage devices, the stored program instructions comprising:
program instructions to generate a plurality of test machine learning pipeline instances based upon a target machine learning pipeline;
program instructions to evaluate the plurality of test machine learning pipeline instances for failure in a task;
program instructions to identify one or more root causes of error based upon the evaluated plurality of test machine learning pipeline instances and failure in the task;
program instructions to create a remediated target machine learning pipeline based upon the identified one or more root causes of error; and
program instructions to output the remediated machine learning pipeline that repairs the one or more root causes of error in the plurality of test machine learning pipeline instances, wherein the remediated machine learning pipeline depicts and details differences between the remediated machine learning pipeline and the plurality of test machine learning pipeline instances, the identified one or more root causes of corruption, and where the results were implemented in the plurality of test machine learning pipeline instances.

16. The computer program product of claim 15, further comprising: program instructions to receive the target machine learning pipeline.

17. The computer program product of claim 15, further comprising: program instructions to implement the remediated machine learning pipeline by using the remediated machine learning pipeline as input for one or more automated machine learning instances.

18. The computer program product of claim 15, further comprising: program instructions to generate a ranked list of the identified one or more root causes; and program instructions to output the ranked list to a user, wherein the outputted ranked list is a responsive prompt displayed on a user interface.

19. The computer program product of claim 15, further comprising: program instructions to generate a ranked list of the identified one or more root causes and one or more solutions for the identified one or more root causes; program instructions to display a responsive prompt detailing the generated ranked list to one or more users, wherein the responsive prompt queries the one or more users to confirm, deny, or customize the generated ranked list of the identified one or more root causes and the one or more solutions; responsive to receiving a response from the user, through the user interface, program instructions to implement the one or more solutions or rejects; and program instructions to store the one or more solutions to a database.

20. The computer program product of claim 15, wherein the outputted remediated machine learning pipeline comprises a detailed explanation of the remediated machine learning pipeline.

* * * * *